(12) United States Patent
Gradu et al.

(10) Patent No.: US 6,293,379 B1
(45) Date of Patent: Sep. 25, 2001

(54) HYDROKINETIC TORQUE CONVERTER

(75) Inventors: Mircea Gradu, Wooster, OH (US); Uwe Wagner, Sinzheim (DE); Volker Middelmann, Wooster, OH (US); Shailesh Kozarekar, Stow, OH (US); Edmund Maucher, Wooster, OH (US); Wolfgang Reik, Bühl (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/526,712

(22) Filed: Mar. 15, 2000

Related U.S. Application Data

(62) Division of application No. 09/089,570, filed on Jun. 3, 1998, now Pat. No. 6,050,375.

(30) Foreign Application Priority Data

Jun. 5, 1997 (DE) .............................................. 197 23 492

(51) Int. Cl.[7] .................................................... F16D 33/04
(52) U.S. Cl. .................. 192/3.22; 192/3.27; 192/3.32
(58) Field of Search ................................. 192/3.21, 3.22, 192/3.23, 3.24, 3.27, 3.32

(56) References Cited

U.S. PATENT DOCUMENTS

| | | | |
|---|---|---|---|
| 2,738,689 | * 3/1956 | Dodge | 192/3.23 |
| 2,964,975 | * 12/1960 | Lorean | 192/3.23 |
| 3,189,144 | * 6/1965 | Gabriel | 192/3.22 |
| 4,077,502 | * 3/1978 | Nitsche et al. | 192/3.23 X |
| 4,869,128 | * 9/1989 | Ohkubo | 192/3.24 X |
| 5,334,112 | * 8/1994 | Nogle et al. | 192/3.23 X |
| 5,924,534 | * 7/1999 | Okubo | 192/3.24 |

* cited by examiner

Primary Examiner—Charles A Marmor
Assistant Examiner—Ha Ho
(74) Attorney, Agent, or Firm—Darby & Darby

(57) ABSTRACT

A hydrokinetic torque converter for use with a transmission in the power train of a motor vehicle has a housing rotatable by the engine and containing a pump, a turbine and at least one stator as well as a rotary output device connected to the input shaft of the transmission. The pump is normally rotatable by the housing; the turbine is rotatable (a) by the fluid which is circulated by the pump or (b) by the housing in response to engagement of a lockup clutch; and the stator can be connected to the stationary case of the transmission or is rotatable by the circulating fluid. First and second hubs are non-rotatably but axially movably mounted on the output member and are respectively connectable with the turbine and the stator by suitable clutches. The hubs can move axially relative to the output device between several positions in one of which the turbine can drive the input element of the transmission in a forward direction, in another of which the stator can rotate the input element in a direction to drive the vehicle rearwardly, and in a third of which the transmission is in neutral gear.

10 Claims, 11 Drawing Sheets

HYDROKINETIC TORQUE CONVERTER

This is a division of application Ser. No. 09/089,570, filed Jun. 3, 1998 now U.S. Pat. No. 6,050,375. Each of these prior applications is hereby incorporated herein by reference, in its entirety.

BACKGROUND OF THE INVENTION

The invention relates to improvements in hydrokinetic or hydrodynamic torque converters.

A standard hydrokinetic torque converter comprises certain basic components including a housing, a pump which is confined in the housing and receives torque from a suitable prime mover (such as by way of the housing), a turbine in the housing, and an optional stator in the housing. The turbine receives torque from the pump and drives an output element, e.g., the input shaft of a transmission if the torque converter is installed in the power train of a motor vehicle between an internal combustion engine (which drives the housing) and a variable speed transmission, particularly an automated transmission. The ratio of the transmission is or can be changed by one or more suitable actuators to shift the transmission into neutral, reverse or a selected forward gear. When utilized in conjunction with an automated transmission, a torque converter can serve as a means for starting, as a means for equalizing the RPM of the input element of the transmission with the engine RPM and, if necessary, also as a torque increasing or amplifying means.

Presently known automated transmissions in the power trains of motor vehicles are designed in such a way that a shifting from a forward gear into reverse gear, or vice versa, necessitates the shifting into an intermediate gear. For example, an automated transmission of such character can embody a suitable planetary gearing. A drawback of such transmissions is that they are complex and expensive because each such transmission comprises a large number of in part complex components which contributes to the initial, assembly and maintenance cost of the transmission and of the entire power train.

OBJECTS OF THE INVENTION

An object of the invention is to provide a hydrokinetric torque converter which renders it possible to employ a relatively simple, compact and inexpensive transmission, particularly an automated transmission, when such apparatus are utilized in the power train of a motor vehicle.

Another object of the invention is to provide a hydrokinetic torque converter which renders it possible to change ratio of an automated transmission from forward to reverse or vice versa in a novel and improved way.

A further object of the invention is to provide a hydrokinetic torque converter which renders it possible to reduce the fuel consumption of the internal combustion engine in the power train of a motor vehicle in which the torque converter and a transmission are being put to use.

An additional object of the invention is to provide a novel and improved power train which embodies the above outlined hydrokinetic torque converter and can be utilized in a motor vehicle to transmit torque from the engine to the wheels of the vehicle.

Still another object of the invention is to provide a hydrokinetic or hydrodynamic torque converter wherein the turbine(s), the pump(s), the stator(s) and/or the associated parts in the rotary housing of the torque converter are distributed and cooperate in a novel and improved way.

A further object of the invention is to provide a novel and improved system or combination of torque transmitting components (such as claw clutches and/or other types of clutches) which can be utilized in or with a hydrokinetic torque converter of the above outlined character.

Another object of the invention is to provide a novel and improved arrangement of actuators for the aforementioned torque transmitting components to influence the direction of rotation and/or other parameters of the rotary output element of the torque converter, such as the input shaft of an automated transmission in the power train of a motor vehicle.

An additional object of the invention is to provide a novel and improved arrangement of synchronizers for use in the housing of or with the above outlined hydrokinetic torque converter to influence the acceleration and/or deceleration of various rotary constituents which serve to transmit torque to the rotary output element of the torque converter.

Still another object of the invention is to provide a novel and improved apparatus for selecting the magnitude and/or other parameters of torque being transmitted or being transmissible to a transmission (such as an automated transmission) in the power train of a motor vehicle.

A further object of the invention is to provide a novel and improved lockup clutch or bypass clutch for use in the above outlined hydrokinetic torque converter.

Another object of the invention is to provide a hydrokinetic torque converter which can be utilized as a superior substitute for conventional torque converters in the power trains of existing types of motor vehicles.

SUMMARY OF THE INVENTION

One feature of the invention resides in the provision of a hydrokinetic torque converter which comprises a rotary housing, a pump which is confined in and is rotatable by the housing, a rotary turbine component and at least one rotary stator component in the housing, a drive (such as an internal combustion engine of a motor vehicle) for the housing, an output device rotatable in the housing in a clockwise and in a counter-clockwise direction, means for connecting the output device with one of the components to rotate the output device in one of the two directions, and means for connecting the output device with the other of the components to rotate the output device in the other direction.

At least one of the connecting means can comprise at least one engageable and disengageable clutch which permits the respective component to rotate relative to the output device in the disengaged condition of the clutch.

The torque converter can be utilized with advantage with a transmission having a stationary case and a rotary input element (such as a shaft) which is arranged to receive torque from the output device. At least one of the connecting means can include a hub which non-rotatably and axially movably surrounds the output device, and at least one engageable and disengageable clutch which is arranged to transmit torque between the respective component and the hub in the engaged condition of the clutch. Such torque converter preferably further comprises an engageable and disengageable form-locking connection between the hub and the case of the transmission. The form-locking connection can comprise a first gear which is provided on the transmission case and a second gear which is provided on the hub and is arranged to mate with the first gear in the engaged condition of the form-locking connection.

At least one of the two connecting means can comprise at least one form-locking clutch, e.g., a claw clutch.

Alternatively, the at least one connecting means can comprise at least one friction clutch.

Another feature of the invention resides in the provision of a hydrokinetic torque converter which comprises a rotary housing, a pump which is confined in and is rotatable by the housing, a drive (such as the aforementioned engine) for the housing, a rotary turbine and at least one stator provided in the housing, a rotary output device (such as a shaft) which is rotatable in clockwise and counterclockwise directions, means for connecting the output device with the turbine to rotate the output device in one of the clockwise and counterclockwise directions, and means for connecting the output device with the at least one stator to rotate the output device in the other direction. The torque converter has a first operating mode in which the output device is connected with the turbine to rotate in the one direction, and a second operating mode in which the output device is connected with the at least one stator to rotate in the other direction.

The torque converter can be set to assume a third operating mode in which the output device is disconnected from the turbine as well as from the at least one stator.

Such torque converter can further comprise at least one engageable and disengageable clutch which is arranged to transmit torque between the turbine and the output device in the first operating mode of the torque converter. This torque converter can further comprise a rotary hub which is arranged to receive torque from the at least one clutch, and a form-locking connection which serves to transmit torque between the hub and the output device.

Still further, the torque converter can comprise at least one engageable and disengageable clutch which is arranged to transmit torque between the at least one stator and the output device in the second operating condition or mode of the torque converter. This torque converter can further comprise a rotary hub serving to receive torque from the at least one clutch, and a form-locking connection which serves to transmit torque between the hub and the output device.

At least one of the connecting means can comprise gears which are movable into and out of mesh with each other.

The means for connecting the turbine with the output device can comprise a hub which non-rotatably but axially movably surrounds the output device, and at least one engageable and disengageable clutch which serves to connect the turbine with the hub and to disconnect the turbine from the hub. If such torque converter is used in connection with a transmission (such as an automated transmission) having a stationary case and a rotary input element arranged to receive torque from the output device, the torque converter preferably further comprises a separable form-locking connection between the turbine and the transmission case.

The means for connecting the at least one stator with the output device can comprise a hub which non-rotatably but axially movably surrounds the output device, and at least one engageable and disengageable clutch which is arranged to connect the at least one stator with and to disconnect the at least one stator from the hub. If such torque converter is utilized in conjunction with a variable-speed transmission having a stationary case and a rotary input element adapted to receive torque from the output device of the torque converter, the latter preferably further comprises a separable form-locking connection between the at least one stator and the transmission case.

A further feature of the invention resides in the provision of a hydrokinetic torque converter which comprises a housing rotatable about a predetermined axis, means (such as the camshaft or the crankshaft of an internal combustion engine in the power train of a motor vehicle) for rotating the housing, a pump in the housing, a turbine which is rotatable in the housing, at least one stator which is rotatable in the housing, a rotary output device in the housing, first and second hubs non-rotatably but axially movably surrounding the output device, means for separably connecting the turbine with the first hub to rotate the output device in a first direction, means for separably connecting the at least one stator with the second hub to rotate the output device in a second direction counter to the first direction, and means for moving the hubs axially of the output device between a plurality of positions including a first position in which the first hub can receive torque from the turbine and a second position in which the second hub can receive torque from the at least one stator.

Such torque converter can further comprise means (such as a thrust bearing) for rotatably coupling the hubs to each other for joint movement in the axial direction of the output device.

The means for moving the hubs axially of the output device can comprise at least one fluid-operated motor including a reciprocable piston; such piston preferably includes at least one of the two hubs.

The novel features which are considered as characteristic of the invention are set forth in particular in the appended claims. The improved torque converter itself, however, both as to its construction and its mode of operation, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
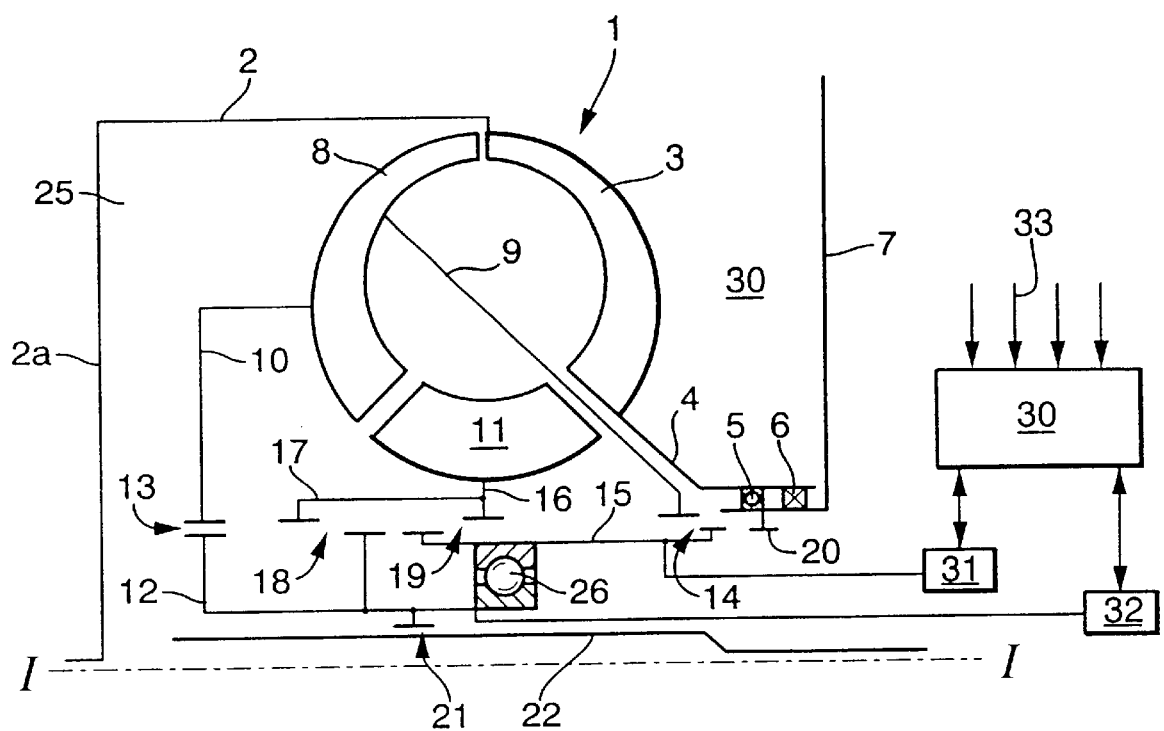
FIG. 1 is a fragmentary schematic axial sectional view of a hydrokinetic torque converter which embodies one form of the invention and is installed between the engine and the transmission in the power train of a motor vehicle.

Referring first to FIG. 1, there is shown one-half of a hydrokinetic or hydrodynamic (hereinafter called hydrokinetic) torque converter 1 which embodies one form of the present invention. The housing 2 of the torque converter 1 is rotatable about an axis I—I and contains a pump 3, a turbine 8 and a stator 11. A substantially radial wall 2a of the housing 2 is adjacent and is connected to the rotary output member of a suitable prime mover, e.g., to the crankshaft or the camshaft of an internal combustion engine in the power train of a motor vehicle.

The pump 3 is rotated by and its vanes or blades (not specifically shown in FIG. 1) can be affixed to or of one piece with the housing 2. A connector 4 is provided to operatively connect the pump 3 with a bearing 5 and a sealing element 6 which are provided to rotatably and sealingly couple the pump 3 with the case 7 of a transmission.

The turbine 8 is installed in the housing 2 between the pump 3 and the aforementioned substantially radial wall 2a. The stator 11 is disposed between the pump 3 and the turbine 8. A connector 10 is employed to couple the turbine 8 with a hub 12 in response to engagement of an engageable and disengageable clutch 13. The latter is shown in FIG. 1 in the engaged condition, i.e., the turbine 8 can transmit torque to the hub 12.

A further connector 9 is provided to establish a form-locking connection between the turbine 8 and a hub 15 for the stator 11 in response to engagement of a second engageable and disengageable clutch 14. FIG. 1 shows the clutch 14 in the disengaged condition, i.e., the turbine 8 can rotate relative to the stator 11.

An additional connector 17 serves to connect the stator 11 with the hub 12 in response to the engagement of a third engageable and disengageable clutch 18 (shown in FIG. 1 in the disengaged condition), and still another connector 16 serves to couple the stator 11 with the hub 15 in response to engagement of an engageable and disengageable clutch 19 (shown in FIG. 1 in the disengaged condition).

The aforementioned clutch 14 can establish a connection between the connector 9 and the hub 15 or between the hub 15 and a gear 20 which is rigid with the non-rotatable transmission case 7.

The reference character 22 denotes a rotary output element of the torque converter 1, and such output element 22 can constitute the rotary input element (such as a shaft) of the transmission in the case 7. FIG. 1 shows the clutch 13 in that (engaged) condition in which the turbine 8 can transmit torque to the hub 12 which, in turn, can rotate the output element 22 by way of a gear 21. The stator 11 is free to turn relative to the hub 15 and relative to the hub 12 because the clutches 19, 18 are disengaged.

The just outlined mode of operation is established when the output element 22 is to rotate in order to cause the transmission in the case 7 to drive the motor vehicle in a forward direction at a speed which is established by the selected ratio of the transmission. The stator 11 is free to turn in the fluid stream which is established in the housing 2 by the rotating pump 3 and causes the turbine 8 to rotate the hub 12 (and hence the output element 22) via connector 10, engaged clutch 13 and gear 21. The rotating stator 11 does not transmit torque because the clutches 18 and 19 are disengaged. The RPM ratio v is greater than the RPM ratio $v_{kupp}$ at the clutch point. The RPM ratio $v_{kupp}$ is the relationship between the turbine RPM $v_{turb}$ and the pump RPM $v_{pump}$.

The portion 25 of the internal space of the housing 2 can accomodate a customary lockup clutch or bypass clutch (hereinafter called lockup clutch) which can be operated to establish a direct torque transmitting connection between the output member of the prime mover (which drives the wall 2a) and the output element 22. Such lockup clutch can be engaged to transmit torque by friction from the wall 2a or from another part of the housing 2 to an axially movable piston which can transmit torque to the output element 22, e.g., by way of the hub 12 and gear 21. A lockup clutch is shown (at 150) in FIG. 4.

The hub 15 for the stator 11 is normally held against rotation about the axis I—I. An antifriction bearing 26 is provided between the rotary hub 12 and the hub 15.

The clutches 13, 14, 18, 19 can be operated mechanically and/or hydraulically or in any other suitable manner. FIG. 1 shows an electronic control unit 30 which has a plurality of signal receiving inputs 33 and signal transmitting connections with a first suitable actuator 31 for the clutches 14, 19 and a second suitable actuator 32 for the clutches 13, 18. The actuators 31, 32 comprise or control suitable drive means such as electric motors and/or fluid-operated motors, magnets or the like. As used herein, the term "actuator" is intended to denote a "device that performs an action or outputs a signal in response to a signal from a computer" (see the Glossary of Terms in "Modern Automotive Technology" by James E. Duffy, published in 1994 by the Goodheart-Wilcox Company, Inc.).

The signal processing and evaluating circuit of the control unit 30 can receive signals from a number of various sensors and/or other monitoring means (e.g., circuits), such as RPM sensors, fuel consumption sensor(s), sensors which monitor the selected and/or the actual ratio of the transmission, an electronic engine control circuit, an electronic circuit which controls and monitors an antiskid device, one or more sensors denoting the presence or absence of an intent on the part of the operator of the motor vehicle to shift the transmission in the case 7 into a different gear, the condition of the brake(s) and/or others.

Figure 2:
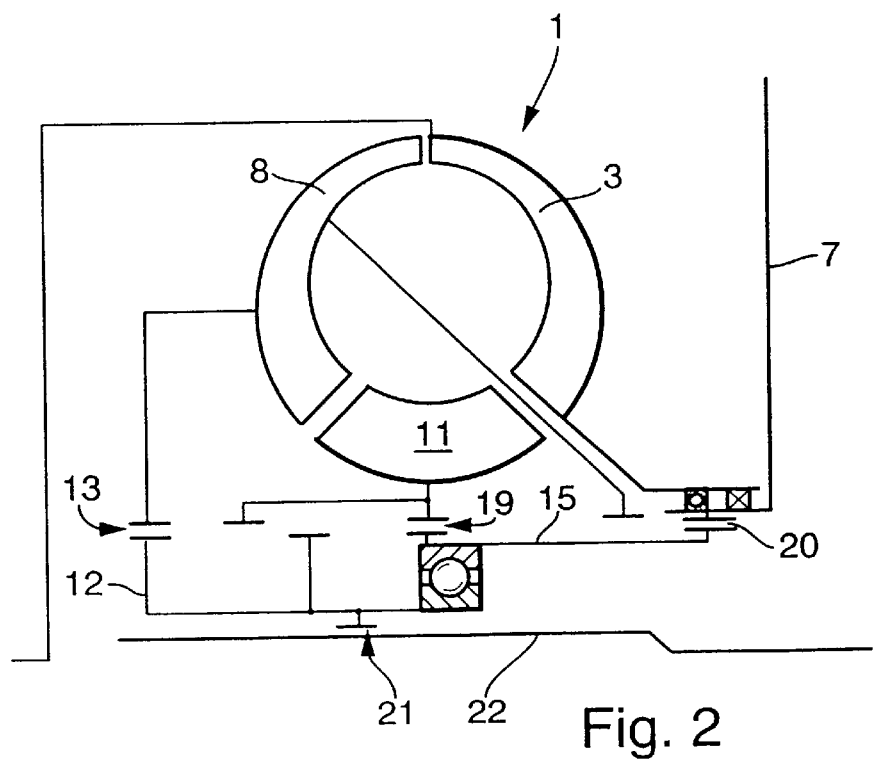
FIG. 2 is a fragmentary schematic axial sectional view of a second hydrokinetic torque converter with the turbine connected to the output device.

FIG. 2 shows a portion of the novel hydrokinetic torque converter 1 with its component parts in positions and conditions they assume when the torque converter is called upon to increase the torque being transmitted from a prime mover (connected to the housing 2 and to the pump 3 in the housing) to the rotary input element 22 of an automated transmission in the case 7 (the input element 22 of the transmission also performs the function of the output element of the torque converter 1). The clutch 13 is engaged so that the turbine 8 rotates the hub 12 which, by way of the gear 21, rotates the output element 22. The stator 11 is connected with the hub 15 by way of the (engaged) clutch 19 so that the stator is held against rotation because it is non-rotatably coupled to the transmission case 7 by the (engaged) gear 20. The torque converter 1 of FIG. 2 increases the transmitted torque and drives its output element 22 (i.e., the input element of the transmission in the case 7) in a forward direction. The torque converter is operated in the conversion mode, i.e., the stator 11 is held against rotation by the transmission case 7 and the RPM ratio v is less than the RPM ratio $v_{kupp}$ at the clutch point.

Figure 3:
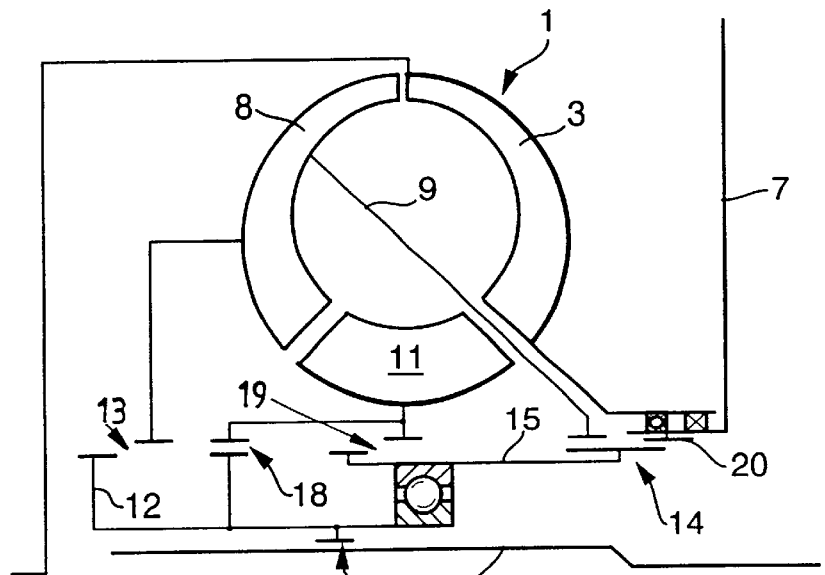
FIG. 3 illustrates the structure of FIG. 2 but with the stator connected to the output device.

Referring to FIG. 3, the components of the hydrokinetic torque converter 1 are shown in the positions and conditions they assume when the input element 22 is rotated in a direction to ensure that the transmission in the case 7 drives the motor vehicle in reverse. The turbine 8 transmits torque to the hub 15 by way of the connector 9 and (engaged) clutch 14. At the same time, the gear 20 connects the hub 15 with the stationary transmission case 7 so that the hub 15 cannot rotate the input element 22. The stator 11 is non-rotatably coupled to the hub 12 by way of the (engaged) clutch 18. The form-locking connection including the gear 21 causes the input element 22 to rotate with the hub 12. The transmission in the case 7 is shifted into reverse gear and the torque converter 1 is set to increase the torque; the turbine 8 is held against rotation and the apparatus is in the conversion mode, i.e., the turbine 8 cannot rotate relative to the stationary (non-rotating) transmission case 7. The RPM ratio v is less than the RPM ratio $v_{kupp}$ at the clutch point.

It will be seen that FIGS. 1, 2 and 3 show one and the same torque converter during three different stages (i.e., in three different modes) of operation. All that is necessary to shift from one of these modes into a different mode is to move the hub 12 and/or 15 in the direction of the axis I—I. This causes selected clutches to become engaged or disengaged and various form-locking connections (such as that including the gear 20) to become active or inoperative.

When the hubs 12, 15 are shifted axially of the input element 22 of the transmission in the case 7 (i.e., of the output element of the torque converter 1) to the positions shown in FIG. 3, the turbine 8 is not connected with the hub 12 (because the clutch 13 is disengaged), and the stator 11 is not connected with the hub 15 because the clutch 19 is disengaged. The clutch 18 (e.g., a claw clutch) connects the stator 11 with the output element 22 of the torque converter by way of the gear 21 (e.g., a bevel gear).

In order to achieve a smooth transition from one gear into a different gear of the transmission in the case 7, the torque converter 1 is preferably provided, combined or associated with suitable synvhronizing mechanisms or units which are designed to conform the RPM of a driving part to the RPM of a driven part before such parts are positively (such as form-lockingly) connected to each other by the respective ones of various engageable and disengageable clutches. This will now be described with reference to FIG. 4 which shows a portion of a second hydrokinetic torque converter 101 having a housing 102 rotatable about an axis II—II. The housing 102 can constitute a deep drawn part made of a metallic sheet material and includes two cupped sections 102a, 102b which are interfitted and their open ends are sealingly secured to each other by a welded seam 102c and/or in any other suitable way. The radially inner portion 104 of the housing section 102b is sealingly and rotatably connected with the case 107 of a transmission by way of a suitable bearing 105 (e.g., an antifriction ball bearing) and at last one sealing element 106.

The internal space of the housing 102 receives a pump 103 having vanes or blades which can be affixed to or made of one piece with the housing section 102a, a turbine 108 which is rotatable with and relative to the pump 103, and a stator 111 disposed between the radially inner portions of the pump 103 and turbine 108.

The housing 102 further contains the aforementioned lockup clutch 150 which is installed between the radially extending wall of the housing section 102a and the turbine 108. The radial wall of the housing section 102a is adjacent to and receives torque from the rotary output member of a prime mover, e.g., from the camshaft or crankshaft of an internal combustion engine in the power train of a motor vehicle. A power train is shown, for example, in FIG. 1 of the commonly owned U.S. Pat. No. 5,674,155 (granted Oct. 7, 1997 to Otto et al. for "METHOD OF AND APPARATUS FOR TRANSMITTING TORQUE IN THE POWER TRAINS OF MOTOR VEHICLES") which depicts schematically a power train including a prime mover, an automated transmission, and a hydrokinetic torque converter with lockup clutch between the prime mover and the transmission. The disclosure of this U.S. patent is incorporated herein by reference.

In normal operation, the prime mover drives the housing 102 which causes the pump 103 to set the body of fluid in the housing in rotary motion, and such fluid imparts rotary motion to the turbine 108 and/or to the stator 111.

The turbine 108 comprises a shell 108a having a radially inner portion which is affixed (e.g., riveted, as at 114) to a separately produced radially inner part 113. The part 113 of the turbine 108 comprises two portions 113a, 113b at the opposite sides of the radially inner portion of the shell 108a, and the portions 113a, 113b rotatably surround an external collar 112a of a rotary output element 112 of the torque converter 101. A hub 120 for the turbine 108 is movable (toward and away from the collar 112a) axially of the output element 112 but cannot rotate relative to such output element.

The peripheral surface of the collar 112a is smooth and can be engaged by the internal surfaces of the aforementioned portions 113a, 113b of the radially inner part 113 of the turbine 108. Thus, when the hub 120 is maintained in the axial position which is shown in FIG. 4, the turbine 108 and the output element 112 can rotate relative to each other.

The output element 112 has an internal gear 112b with teeth which mesh with the teeth of a complementary external gear 115a provided on a rotary input shaft 115 of the transmission in the case 107. The parts 112, 115 can be said to constitute a composite output element of the torque converter 101 or a composite input element of the transmission in the case 107.

The radially innermost portion 102d of the housing section 102a is a relatively short cylinder or tube which serves as a means for centering the housing 102 on the output member of the prime mover.

Figure 4:
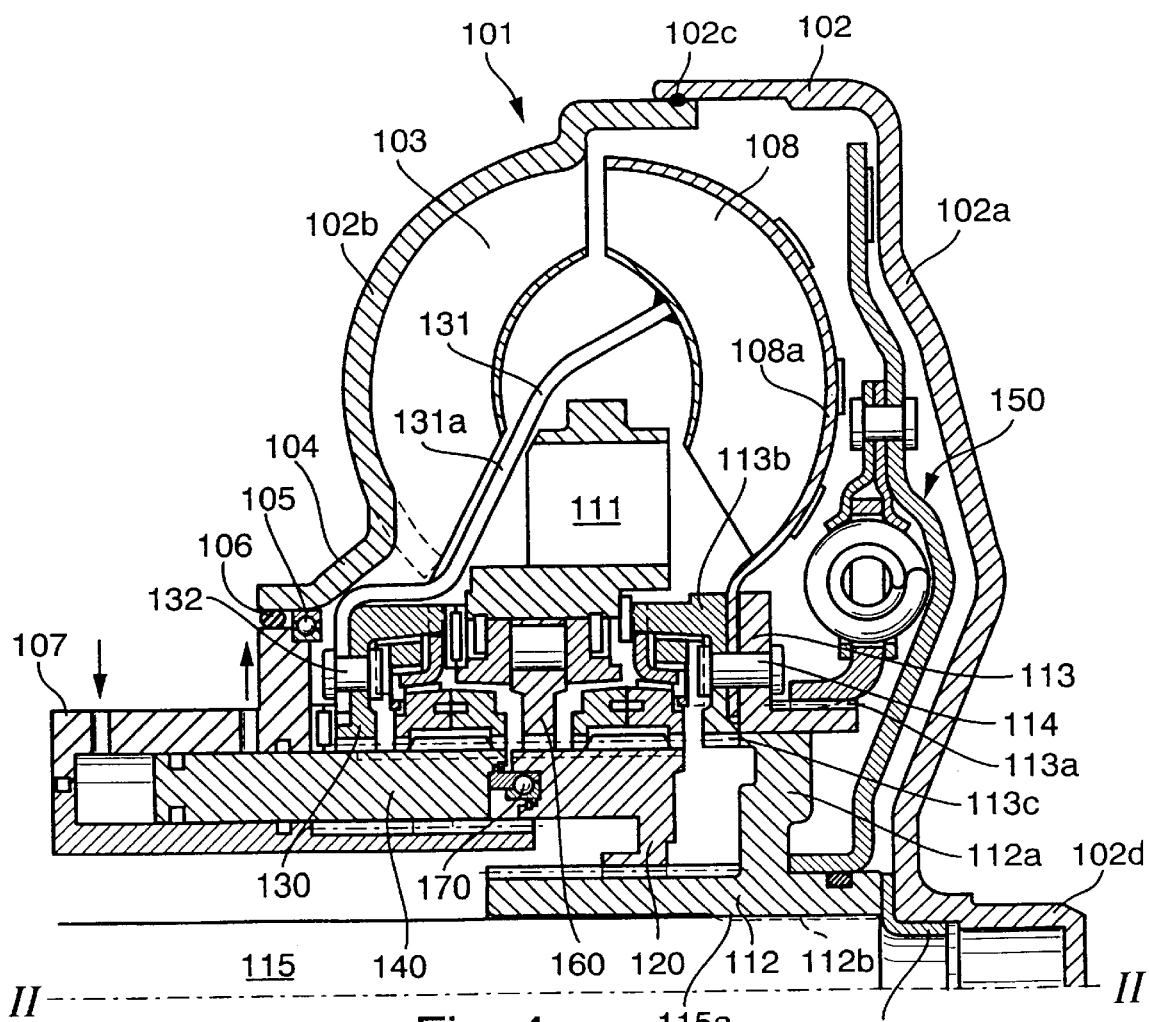
FIG. 4 is a fragmentary axial sectional view of a third torque converter.

FIG. 4 shows the torque converter 101 in a neutral condition. The stator 111 and the turbine 108 can turn relative to the output element 112 and/or vice versa, i.e., the input element 115 of the transmission in the case 107 is not driven.

The hub 120 for the turbine 108 cannot turn relative to but can move axially of the output element 112. This is ensured by the provision of a non-referenced toothed connector including axially parallel external teeth of the output element 112 and axially parallel internal teeth of the hub 120. When moved in a direction to the right, as viewed in FIG. 4, the hub 120 can establish a torque transmitting connection between the turbine 108 and the output element 112 by way of the part 113, and such connection is terminated (interrupted) in response to a movement of the hub 120 in a direction to the left, i.e., back to the axial position of FIG. 4.

The turbine 108 comprises or cooperates with a second separately produced inner part 130 having internal teeth movable into and out of mesh with complementary external teeth of the hub 140 for the stator 111. In the embodiment of FIG. 4, the second radially inner part 130 is coupled with the turbine 108 by a conical connector 131 which is affixed (such as riveted at 132) to the radially inner part 130. The conical connector 131 has ports 131a which permit the fluid (such as oil) to flow within the torus of the torque converter 101. It is preferred to install the conical connector 131 in that portion of the internal space of the housing 102 which receives the circulating portion of the confined fluid. In lieu of utilizing a conical connector 131, it is also possible to employ two or more braces (not shown) or analogous parts which define passages for the flow of fluid between them (i.e., such passages can replace the ports 131a).

The hub 140 for the stator 111 is axially movably but non-rotatably coupled to the transmission case 107. This hub is movable to and from an axial position in which its external gear mates with a complementary internal gear of the part 130 to hold the turbine 108 against rotation with the housing 102 and pump 103, i.e., to non-rotatably connect the turbine with the transmission case 107.

The stator 111 comprises a separately produced radially inner part 160 having an internal gear adapted to mesh with a gear at the exterior of the hub 120 for the turbine 108. When such connection is established (in response to axial movement of the hub 120 in a direction to the left, as viewed in FIG. 4), the stator 111 is non-rotatably coupled to the output element 112 by way of the hub 120. Such connection between the output element 112 and the stator 111 can be terminated (interrupted) by disengaging the internal gear of the radially inner part 160 from the external gear of the hub 120.

Furthermore, the internal gear of the radially inner part 160 of the stator 111 can be caused to mesh with a complementary external gear of the hub 140 to thus ensure that the stator 111 is non-rotatably attached to the transmission case 107. Such connection between the stator 111 and the transmission case 107 can be terminated (interrupted) in response to appropriate axial displacement of one of the internal gear of the part 160 and the complementary external gear of the hub 140.

A thrust bearing 170 is provided between and rotatably couples the coaxial hubs 120, 140 to each other for joint movement in the axial direction of the torque converter 101. As already explained hereinbefore, the hub 140 cannot but the hub 120 can rotate relative to the stationary transmission case 107.

The hub 140 constitutes or acts as a piston or plunger which is received in a cylinder defined by or connected to the transmission case 107. FIG. 4 shows that the cylinder for the piston or hub 140 is provided with suitably distributed ports for the admission and evacuation of a fluid medium which causes the hub 140 to move with the hub 120 to any one of a plurality of diferent axial positions. Depending upon the selected axial positions of the hubs 120 and 140, the stator 111 and/or the turbine 108 can be connected with or disconnected from the hub 120 or 140.

Figure 4A:
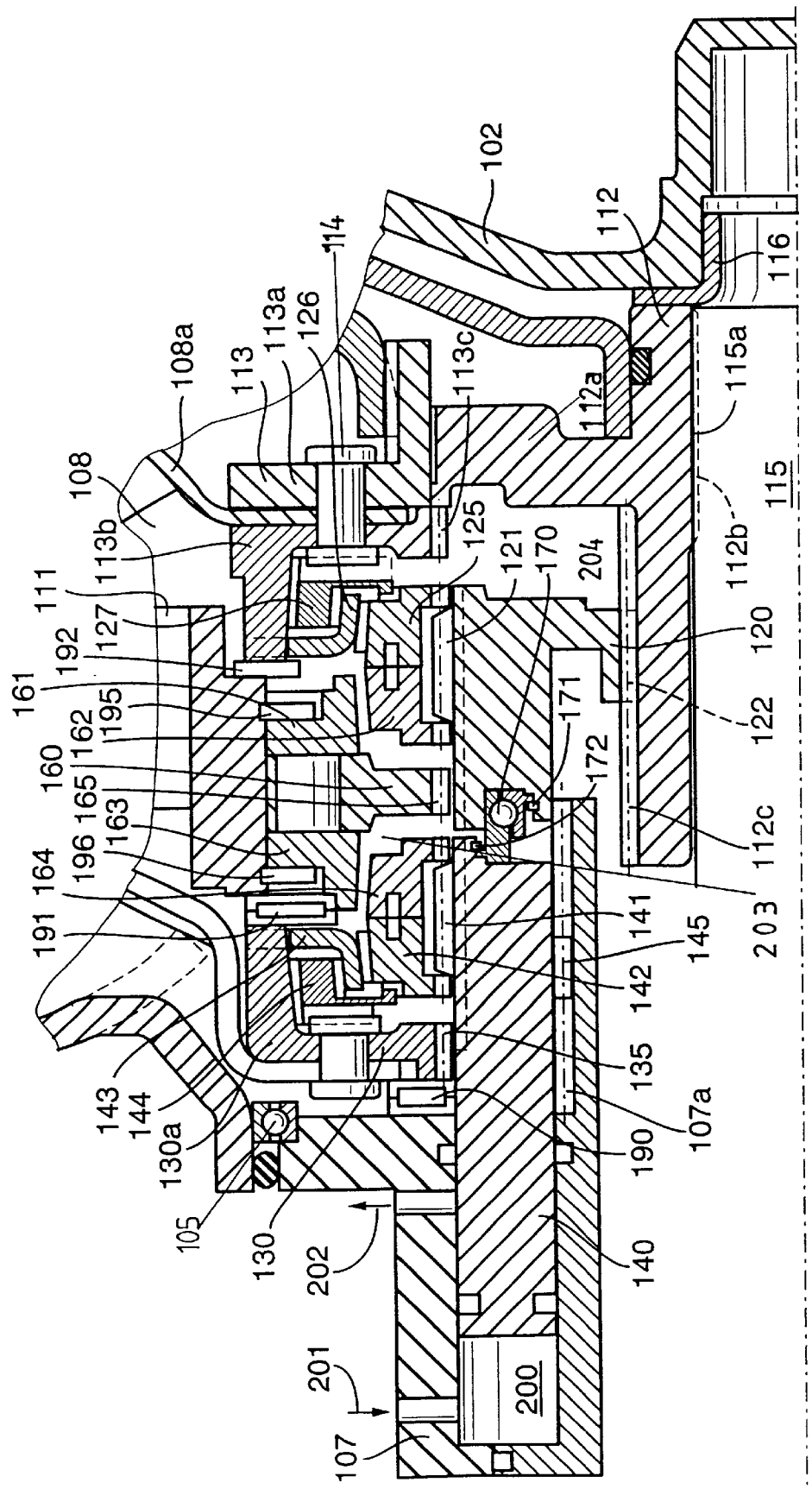
FIG. 4a is an enlarged view of a detail in the torque converter of FIG. 4.

FIG. 4a shows a portion of the torque converter 101 of FIG. 4 drawn to a larger scale. The radially inner portion of the shell 108a of the turbine 108 is secured to the portions 113a, 113b of the radially inner part 113 by the aforementioned rivets 114. The radially inner region of the portion 113a surrounds and is rotatable with reference to the collar 112a of the output element 112. The radially inner region of the portion 113b constitutes or includes an internal gear 113c which can be caused to mesh with an external gear 121 of the hub 120. Such engagement between the gears 113c, 121 can be brought about by moving the hub 120 axially in a direction to the right, as viewed in FIG. 4a.

In the axial position which is shown in FIG. 4a, the hub 120 for the turbine 108 is disengaged from the first radially inner part 113 as well as from the radially inner part 160 of the stator 111. When moved axially in a direction to the right, as viewed in FIG. 4a (i.e., toward the prime mover for the housing 102), a conical external friction surface of a first syncronizing ring 125 (having internal teeth meshing with external teeth of the hub 120) is caused to engage a complementary conical internal friction surface of a second synchronizing ring 126. The external friction surface of the second synchronizing ring 126 then engages an internal friction surface of a third synchronizing ring 127. The rings 126, 127 are carried by the portion 113b of the part 113, i.e., by the shell 108a of the turbine 108. Frictional engagement between the abutting surfaces of the synchronizing rings 125, 126 and 127 ensures that the difference between the RPM of the part 113 of the turbine 108 and the RPM of the hub 120 is gradually and predictably reduced to zero or close to zero. Therefore, the external gear 121 of the hub 120 comes into mesh with the internal gear 113c of the portion 113b of the part 113 when the RPM of the turbine 108 closely approximates or matches the RPM of the hub 120. The gears 113c, 121 establish a form-locking connection between the turbine 108 and the hub 120, and the gears 112c, 122 continue to maintain the hub 120 in form-locking torque transmitting engageent with the output element 112.

If the hub 120 is shifted from the axial position of FIG. 4a but in a direction to the left, the RPM of the part 160 is caused to conform to the RPM of the hub 120 by way of synchronizing rings 161, 162. The synchronizing ring 162 surrounds the hub 120 and comes into frictional engagement with the synchronizing ring 161 which is surrounded by and can rotate the stator 111 as well as the part 160 which latter is mounted to share the angular movements of the stator. Thus, an axial movement of the hub 120 in a direction to the left (as viewed in FIG. 4a) results in the establishment of a torque transmitting connection between the hub 120 and the part 160. The external gear 121 of the hub 120 for the turbine 108 can mate with the internal gear 165 of the part 160 of the stator 111 only when the RPM of the part 160 at least approximates the RPM of the hub 120 (in response to the activation of the synchronizing unit including the rings 161, 162). The stator 111 is then in form-locking engagement with the hub 120.

The thrust bearing 170 ensures that the hub 140 for the stator 111 shares all axial movements of the hub 120 for the turbine 108. More accurately stated, the movements of he hub 120 in a direction to the right (as viewed in FIG. 4a) are initiated by the hub 140 in response to admission of a pressurized fluid into the cylinder chamber 200 of the transmission case 107 by way of a port 201, and the movements of the hubs 120, 140 in a direction to the left (again as viewed in FIG. 4a) are initiated in response to admission of a pressurized fluid into the cylinder chamber 203 or 204. A port 202 can serve for the evacuation of some fluid from the cylinder (transmission case 107) for the hub (piston) 140 and the hub 120.

In view of the aforedescribed connection (thrust bearing 170) between the hubs 120 and 140, the leftward axial movement of the hub 120 results in the establishment of a torque transmitting connection between the hub 120 and the part 160 of the stator 111 because the external gear 121 of the hub 120 then meshes with the internal gear 165 of the part 160. A first stage of such leftward movement of the the hubs 120, 140 involves the activation of a further synchronizing unit including synchronizing rings 142, 143, 144 whose operation is or can be identical with or analogous to that of the synchronizing unit including the aforedescribed rings 125, 126 and 127. The synchronizing ring 142 is then in frictional engagement with the synchronizing ring 143 which, in turn, is in frictional engagement with the synchronizing ring 144. The result is that the RPM of the turbine 108 is reduced to zero or at least close to zero, and the external gear 141 of the hub 140 can mesh with the internal gear 135 of the part 130 of the turbine 108. The synchronizing rings 142, 144 cannot rotate or can turn at a very low speed, and the intermediate synchronizing ring 143 (which has preferably conical internal and external friction surfaces respectively engageable with conical surfaces of the rings 142, 144) is compelled to share the angular movements of the turbine 108. For example, the synchronizing ring 143 can be maintained in a suitable form-locking engagement with the turbine 108.

It has been found that the synchronizing units including the rings 125–127 and 142–144 can achieve a highly satisfactory equalization of RPMs (including zero RPM) due to frictional engagement of the intermediate rings 126 and 143 with the respective pairs of rings 125, 127 and 142, 144. The synchronizing rings 125, 127 (and/or the synchronizing rings 142, 144) can be form-lockingly connected with each other.

If the hub 120 is moved in a direction to the right, as viewed in FIG. 4a, such axial movement is necessarily shared by the hub 140 (by way of the thrust bearing 170). This causes the friction surfaces of additional synchronizing rings 163, 164 to engage each other in order to synchronize the RPM of the radially inner part 160 of the stator 111 with the RPM of the hub 140, i.e., the RPM of the part 160 is reduced to zero because the hub 140 is in engagement with the stationary transmission case 107 (i.e., the hub 140 cannot rotate about the axis II—II). Such reduction of the RPM of the part 160 to zero (or at least close to zero) takes place before the external gear 141 of the hub 140 comes into mesh with the internal gear 165 of the part 160.

The bearings 116, 190, 191 and 192 are thrust bearings. The baring 116 is installed between the housing 102 and the output element 112 of the torque converter 101. The bearing 190 is installed between the transmission case 107 (radially inwardly of the radial bearing 105) and the part 130 of the turbine 108; the bearing 191 operates between the portion 130a of the part 130 and the stator 111; and the bearing 192 operates between the stator 111 and the portion 113b of the part 113 of the turbine 108. One or more of the bearings 116 and 190–192 can constitute an antifriction bearing or antifriction bearings (with spherical or other suitable rolling elements between pairs of races). Alternatively, at least one of the bearings 116, 190–192 can constitute a friction bearing (see the bearing 116).

The hub 140 has an internal gear 145 which meshes with an external gear 107a of the stationary transmission case 107 to thus ensure that the hub 140 cannot rotate about the axis II—II.

The thrust bearing between the hubs 120, 140 includes an inner race which is secured to the hub 120 (against axial movement relative to the hub 120) by a split ring 171 and/or in any other suitable way, and a second split ring 172 is provided to secure the outer race of the bearing 170 to the hub 140. Such mounting of the bearing 170 ensures that the hubs 120, 140 are compelled to share all axial movements, that the hub 120 can turn relative to the hub 140, and that the hub 140 can be non-rotatably secured to the transmission case 107 (at 107a, 145) regardless of whether or not the hub 120 rotates about the axis II—II. The hubs 120, 140 are provided with suitable internal grooves for the respective split rings 171, 172. The two races of the thrust bearing 170 can confine one or more annuli of spherical or other suitable rolling elements.

The synchronizing ring 161 is secured in a predetermined axial position relative to the stator 111 by a split ring 195, and a further split ring 196 is provided to maintain the synchronizing ring 163 in a predetermined axial position relative to the stator 111. The synchronizing ring 143 us non-rotatably mounted in the portion 130a of the part 130, and the synchronizing ring 126 is mounted in the portion 113b of the part 113 of the turbine 108.

That portion of the transmission case 107 which defines or constitutes a cylinder, and the piston including the hubs 120, 140 and the thrust bearing 170 between the hubs 120, 140 constitute a double-acting cylinder and piston assembly with cylinder chambers 200, 203 or 200, 204. As a rule, the fluid is a hydraulic fluid (such as oil). The controls (not specifically shown in FIGS. 4 and 4a) for the admission of fluid into and for the evacuation of fluid from the cylinder chambers 200, 203 or 200, 204 are designed to ensure that the turbine 108 and the stator 111 are properly coupled to or uncoupled from the respective hubs 120, 140. This renders it possible to control the output element 112 of the torque converter 101 in a manner which is required to shift the transmission in the case 107 into neutral, into reverse gear, or into a forward gear.

In accordance with a modification, the motor means for effecting axial movements of the hubs 120, 140 and the controls for such motor means can be designed to move the two hubs independently of each other, e.g., by resorting to two discrete cylinder and piston assemblies or other suitable actuators. The piston of one of the plural assemblies is the hub 120, and the piston 140 of the other assembly constitutes or includes the hub 140. The utilization of two discrete assemblies renders it possible to dispense with the thrust bearing 170 as well as with the means for securing such bearing to the hubs 120 and 140. This modification will be readily understood upon perusal of the description of FIGS. 4 and 4a.

Figure 5:
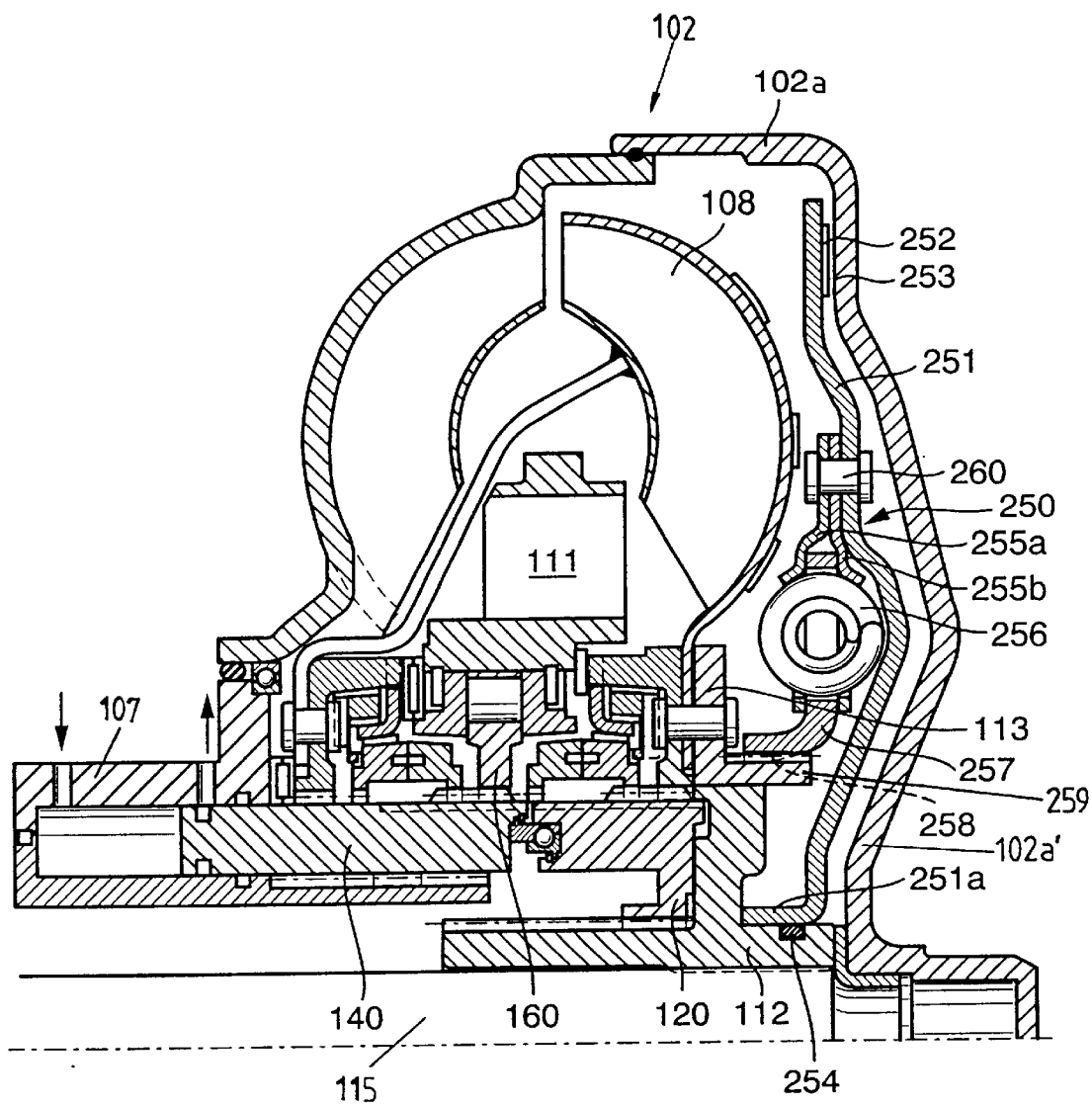
FIG. 5 is a fragmentary axial sectional view of a fourth torque converter.

FIG. 5 shows a portion of a hydrokinetic torque converter which constitutes a further modification of the torque converter 101 of FIGS. 4 and 4a. More specifically, FIG. 5 shows a different mode of connecting the turbine 108 and its part 113 with the output element 112 by way of the axially movable hub 120. The connection can serve to transmit torque and can include at least some of the pairs of internal and external gears which were described with reference to FIGS. 4 and 4a. The input element 115 of the transmission in the case 107 can receive torque from the turbine 108 but not from the stator 111 because the latter is held against rotation about the axis of the torque converter due to its connection with the stationary transmission case 107 by way of the part 160 and the hub 140.

FIG. 5 shows the torque converter in a condition it assumes when the input shaft 115 of the transmission is rotated in a direction to effect a forward movement of the motor vehicle having a power train including the structure of FIG. 5. The stator 111 is connected with the transmission case 107 so that it cannot rotate, and the rotating turbine 108 transmits torque to the output element 112 because it is free to rotate with the hub 120 which, in turn, rotates the output element 112 (which rotates with the input element 115).

A lockup clutch 250 in the space between the turbine 108 and the adjacent radially extending wall 102a' of the driving section 102a of the housing 102 comprises a piston 251 provided with a friction lining 252 arranged to frictionally engage the inner side of a portion 253 of the wall 102a' when the clutch 250 is at least partially engaged. The piston 251 then transmits torque from the wall 102a' (i.e., from the rotary output member of a prime mover) to the output element 112 by way of a torsional vibration damper including one or more tangentially or circumferentially extending coil springs 256. A somewhat similar torque converter with a damper and a lockup clutch is disclosed in commonly owned U.S. Pat. No. 5,501,309 granted Mar. 26, 1996 to Walth et al. for "HYDROKINETIC TORQUE CONVERTER WITH LOCKUP CLUTCH". The disclosure of this patent is also incorporated herein by reference.

A tubular or cylindrical radially innermost portion 251a of the piston 251 extends axially of the torque converter in a direction away from the wall 102a' and surrounds a portion of the output element 112. At least one sealing element 254 (such as an O-ring) is interposed between the cylindrical portion 251a of the piston 251 and the periphery of the output element 112.

If desired, the mounting of the radially innermost portion 251a on the output element 112 can be such that the piston 251 and the output element 112 can turn relative to each other. The lockup clutch can be operated by changing the ratio of fluid pressures in the housing 102 at opposite sides of the piston 251, i.e., between a first plenum chamber (located between the wall 201a' and the piston 251) and a second plenum chamber (between the piston 251 and the shell of the turbine 108). The lockup clutch 250 can be fully disengaged (the friction lining 252 is then out of contact with the portion 253 of the wall 102a'), partially engaged (the friction lining 252 contacts but slips relative to the portion 253) or fully engaged (the piston 251 rotates with the housing section 102a without any slip).

In the lockup clutch 250 of FIG. 5, the friction lining 252 and the adjacent portion 253 of the wall 102a' extend exactly or at least substantially radially of the axis of the torque converter. However, it is often preferred to provide a lockup clutch wherein a frustoconical portion of the piston can engage and become partially or fully disengaged from a complementary frustoconical portion of a wall forming part of the driven rotary housing of the torque converter. Reference may be had, for example, to the aforementioned '155 patent to Otto et al. Furthermore, the friction lining 252 can be omitted, such friction lining can be provided on the portion 253 of the wall 102a', or a friction lining can be provided on each of the piston 251 and the portion 253 of the wall 102a'.

The damper including the coil spring(s) 256 is connected to the piston 251 (radially inwardly of the friction lining 252) by a set of rivets 260 (only one shown in FIG. 5) or in any other suitable way. This damper comprises two profiled washer-like members 255a, 255b which are affixed to the piston 251, and a radially extending washer-like member 257 received in the space between the members 255a, 255b. The members 255a, 255b, 257 have registering windows for the illustrated coil spring 256. The radially innermost portion of the member 257 is a short cylinder or tube having an internal gear 258 mating with an external gear 259 provided on or forming part of the radially inner part 113 of the turbine 108.

When the lockup clutch 250 is engaged (as a result of shifting the piston 251 axially so that the friction lining 252 is in frictional engagement with the portion 253 of the wall 102a'), the piston 251 transmits torque from the housing 102 to the part 113 which rotates the turbine 108 so that the latter can rotate the output element 112 and hence the input element 115 of the transmission in the case 107. The manner in which the hubs 120, 140 can be moved axially and the construction of various synchronizing units in the torque converter of FIG. 5 are or can be the same as or analogous to those already described with reference to FIGS. 1–3 and 4–4a.

The illustrated elementary (single-stage) damper of FIG. 5 can be replaced with a more sophisticated damper (e.g., a multistage damper) and/or can be utilized in conjunction with one or more additional dampers. For example, the torque transmitting connection between the piston 251 and the part 130 of the turbine 108 can comprise a (first) set of tangentially or circumferentially extending coil springs 256 forming part of a first damper, and a (second) set of tangentially or circumferentially extending coil springs (e.g., within the springs 256) forming part of at least one second or additional damper. The plural dampers can be arranged to operate in parallel or in series.

Figure 6:
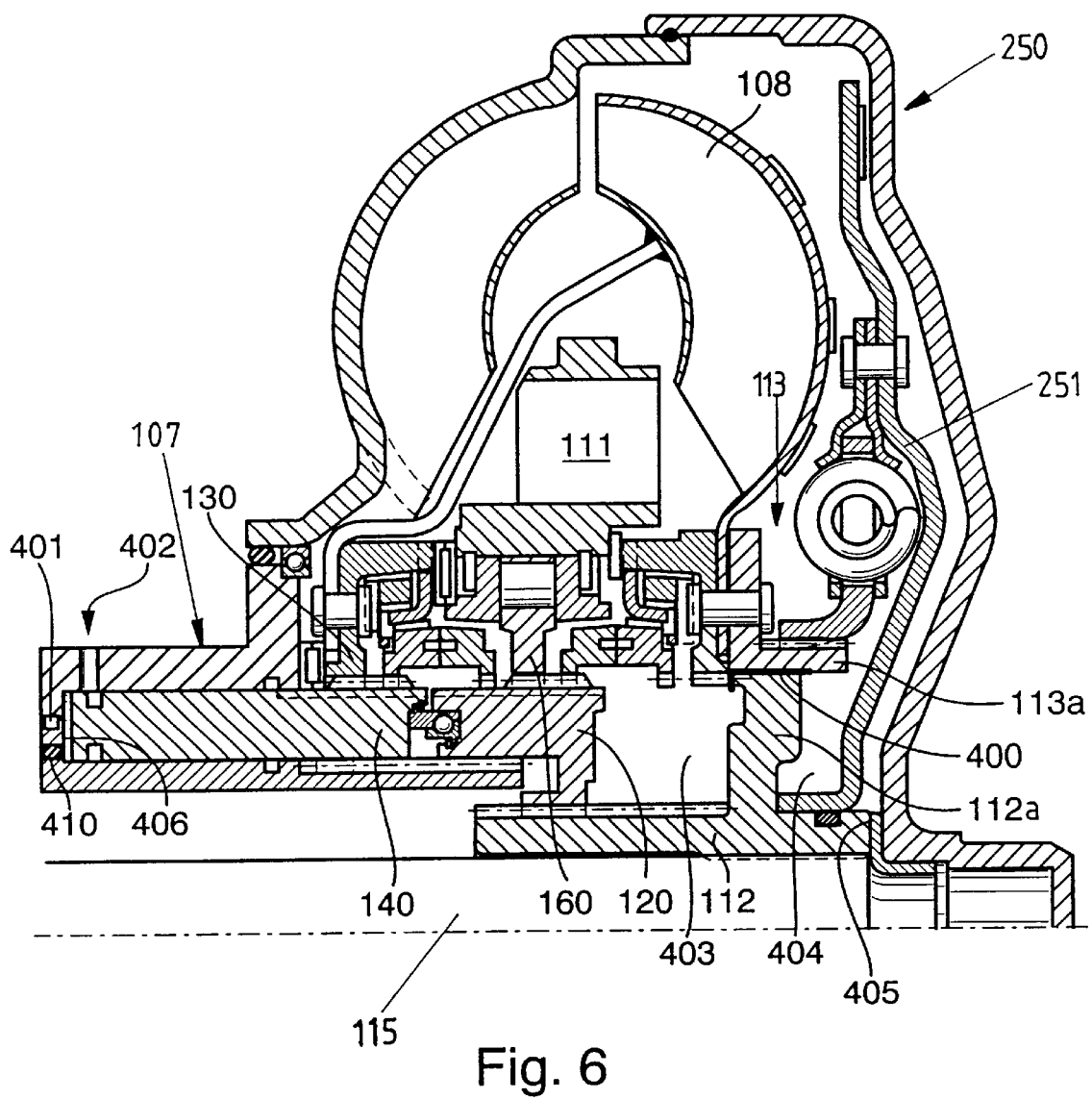
FIG. 6 is a similar fragmentary axial sectional view of a fifth torque converter constituting a modification of the torque converter which is shown in FIG. 5.

FIG. 6 shows a portion of a further torque converter wherein the construction of the lockup clutch 250 (including the piston 251 and its damper) is or can be identical with those described in connection with FIG. 5. One difference between the torque converters of FIGS. 5 and 6 resides in the nature of the connection between the turbine 108 and its part 130 on the one hand, and the hub 140 for the stator 111 on the other hand. The hub 140 is assumed to be fixedly (non-rotatably) secured to the case 107 of the transmission, and the torque converter is assumed to embody at least some of the aforedescribed means for operatively connecting certain coaxial parts with each other by means of mating gears, clutches or the like (reference may be had to FIGS. 4 and 4a).

The stator 111 rotates the input shaft 115 of the transmission in the case 107 because the part 160 of the stator transmits torque to the hub 120 for the turbine 108 and the hub 120 drives the output element 112 which, in turn, drives the input element of the transmission. The manner in which the just outlined torque transmitting connection between the stator 111 and the input element 115 of the transmission in the case 107 is or can be accomplished is or can be the same as already described with reference to FIGS. 1–3, 4–4a and 5.

FIG. 6 shows a sealing element 401 which seals the chamber 406 (corresponding to the chamber 200 shown in FIG. 4a). This sealing element 401 can be installed in the transmission case 107 at a given radial distance from the axis of the torque converter of FIG. 6, particularly midway between the radially innermost and the radially outermost surfaces of the annular hub 140 for the stator 111 (this is actually shown in FIG. 6). However, such sealing element (or an additional sealing element) can also be installed in the transmission case 107 adjacent the radially outer (peripheral) cylindrical surface of the hub 140 or at the internal surface (as at 410).

In order to shift the hubs 120, 140 axially and in a direction to the right (as viewed in FIG. 6), a suitable pressurized fluid is admitted into the chamber 406 by way of an inlet 402 in the transmission case 107. This entails the expulsion of a corresponding quantity of fluid from the other chamber 403 at the right-hand axial end of the hub 120 (the chamber 403 corresponds to the chamber 204 shown in FIG. 4a). If the hubs 120, 140 are shifted in a direction to the left (e.g., back to the axial positions shown in FIG. 6), the chamber 403 receives pressurized fluid from a source and the chamber 406 discharges a corresponding quantity of fluid by way of the port 402 and/or in a different way.

FIG. 6 further shows compartments 404, 405 at opposite sides of the piston 251 of the lockup clutch 250. The latter is engaged when the pressure in the compartment 404 is caused to rise and the compartment 405 is free to discharge a quantity of fluid corresponding to that which is being admitted into the compartment 404. It is assumed here that the fluid in the compartments 404, 405 is a (non-compressible) hydraulic fluid.

The source of pressurized fluid (e.g., one or more pumps and/or accumulators) and the various valves, conduits, sumps and other parts of the system which controls the flow of fluid into and from the chambers 406, 403 as well as into and from the compartments 404, 405 are not shown in FIG. 6 for the sake of clarity and also because such systems are well known in the art. For example, a pressurized fluid (such as oil) can be supplied to the chaber 406 or 403 as well as to the compartment 404 or 405 by way of one or more axially extending channels in the rotary input element 115 of the transmission in the case 107.

FIG. 6 shows the parts of the torque converter in the positions and/or conditions they assume when the transmission in the case 107 is ready to effect a movement of the motor vehicle in reverse. As already mentioned above, the turbine 108 is non-rotatably connected to the transmission case 107, and the stator 111 transmits torque to the output element 112 of the torque converter.

The character 400 denotes a radial friction (slide) bearing having a substantially I-shaped or L-shaped cross-sectional outline and being installed between the portion 113a of the part 113 of the turbine 108 and the collar 112a of he output element 112. The purpose of the bearing 400 is to take up radial stresses between the collar 112a on the one hand, and the turbine 108 on the other hand; furthermore, the bearing 400 is preferably designed and installed to take up axial stresses which the turbine 108 tends to transmit to the output element 112.

It is preferred to establish the necessary or desired connections for the turbine 108 (such as with the hub 120 or with the hub 140) prior or at least in part prior to the establishment of the necessary or desired connections for the stator 111 (e.g., with the hub 140 or with the hub 120). The advantages of such mode of operation will be appreciated upon perusal of the description of the structure shown in FIG. 7 which depicts certain relevant details of the torque converter of FIG. 6.

The external gear 121 of the hub 120 for the turbine 108 is shown in an axial position in which it meshes with an internal gear of the synchronizing ring 125; however, the external gear 141 of the hub 140 for the stator 111 is not (yet) in mesh with the internal gear of the synchronizing ring 164. If the hub 140 is moved axially further in a direction to the right (as viewed in FIG. 7), the synchronizing ring 125 cooperates with the rings 126, 127 of the corresponding synchronizing unit which brakes the turbine 108 and reduces its rotational speed sufficiently before the gear 121 comes into mesh with the internal gear 113c of the radially inner part 113 of the turbine.

Once the hub 140 and its external gear 141 have covered the axial distance 301 (during their movement with the hub 120 in a direction to the right, as viewed in FIG. 2), the external gear 141 comes into mesh with the internal gear of the synchronizing ring 164 which cooperates with the rings 142, 143 of the respective synchronizing unit to brake the stator 111 or to reduce the RPM of the stator to a desired value. It will be seen that the turbine 108 is synchronized prior to synchronization of the stator 111.

Figure 7:
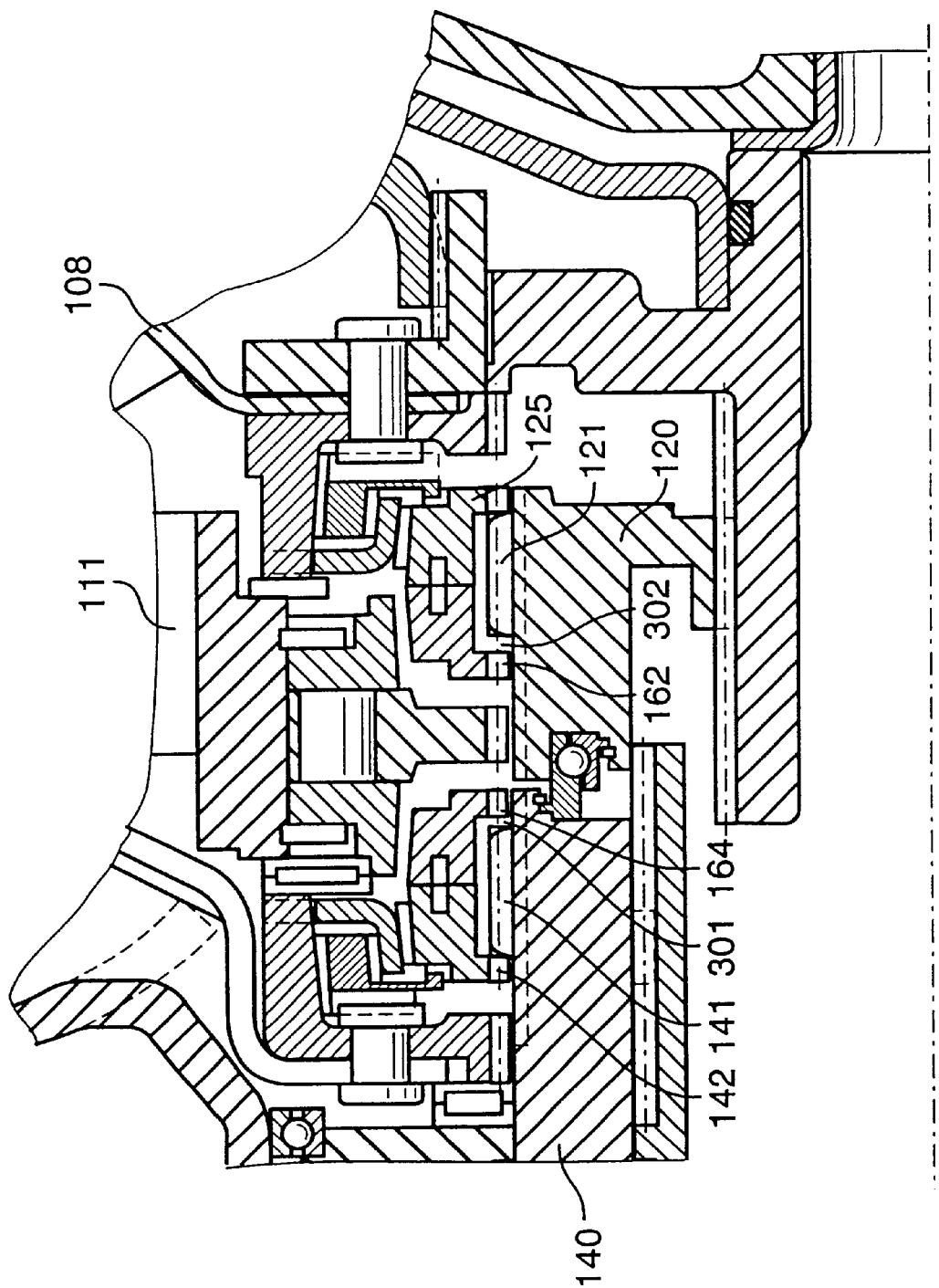
FIG. 7 illustrates certain details of the structure which is shown in FIG. 4a but in different axial positions of the hubs.

The situation is analogous when the hubs 120, 140 are caused to move in a direction to the left (as viewed in FIG. 7). At such time, the synchronizing ring 142 cooperates with the rings 143, 144 to synchronize the turbine 108 via gear 141 and/or hub 140. This takes place before the hubs 120, 140 cover the distance 302 (as seen in the axial direction of the torque converter and in a direction to the left, as seen in FIG. 7). When the movement through the distance 302 is completed, the external gear 121 of the hub 120, or the hub 120, engages the internal gear of the synchronizing ring 162 whereby the ring 162 cooperates with the ring 161 to synchronize the stator 111.

In order to ensure a sequence of operations as described above with reference to FIG. 7, the distances between the synchronizing ranges of the synchronizing rings referred to in the description of FIG. 7 is less than the axial distance between those portions of the hubs 120, 140 which act upon the synchronizing rings. This causes that one of the synchronizing rings (namely the ring 125 or 142) is actuated by the oncoming hub and that another synchronizing ring is actuated upon completion of axial movement through the distance 301 or 302.

If the hubs 120, 140 are movable independently of each other, the sequence of axial movements of the two hubs is determined in advance so as to ensure that a synchronization of the turbine 108 takes place ahead of synchronization of the stator 111. All that is necessary is to properly program the actuators or the controls for the actuators which initiate and effect the axial movements of the independently movable or shiftable hubs 120 and 140.

The transmission in the case 7 or 107 can be a stepped gearing or a continuously variable transmission (CVT). Continuously variable transmissions are described and shown, for example, in commonly owned U.S. Pat. No. 5,667,448 granted Sep. 16, 1997 to Friedmann for "POWER TRAIN". The disclosure of this patent is incorporated herein by reference.

The various clutches which are shown in FIGS. 1–3 can constitute claw clutches or form-locking clutches or any other cluches capable of temporarily connecting the turbine and/or the stator with the turbine hub and/or with the stator hub.

The illustrated synchronizing units can be replaced by or utilized in conjunction with other types of synchronizing units. The illustrated synchronizing units exhibit the important advantage that their space requirements are surprisingly small which is highly important in torque converters or in conjunction with torque converters to be put to use in the power trains of motor vehicles. The feature that the illustrated synchronizing units can be confined in the housing of a torque converter is particularly desirable and advantageous.

It is of further advantage to design the clutches in such a way that they can be located radially inwardly of the torus of the torque converter, or radially inwardly of the pump, stator and/or turbine. The torus is established by the space which is required for the flow of fluid in the interior of the housing of the torque converter.

An important advantage of the axially movable hubs (such as 120 and 140) is that their end faces can be acted upon by a suitable pressurized fluid so that such hubs can perform the functions of pistons or plungers in fluid-operated cylinder and piston motors. The advantages of the provision of a coupling (such as a thrust bearing) between the hubs for the turbine and the stator were pointed out hereinbefore. The advantage of a coupling which constitutes or includes a thrust (axial) bearing is that the hub for the turbine can rotate about its axis while the hub for the stator is held against rotation (such as by the case of the transmission which receives torque from the output element of the torque converter).

The hydrokinetic torque converters which are shown in FIGS. 1 to 7 are preferably designed in such a way that the clutches which serve to connect or disconnect the turbine and/or the stator with and from the housing or the output element of the torque converter are installed in the housing, most preferably within the torus including the pump, the turbine and the stator. This contributes significantly to the compactness of the torque converter, especially as seen in the radial direction of the housing. The ability of the hubs for the turbine and for the stator to move axially of the housing also contributes to the compactness and simplicity of the torque converter, especially if the one and/or the other hub serves as a piston or plunger of a fluid-operated cylinder and piston assembly. This renders it possible to achieve substantial savings in space and a considerable reduction of the total number of parts because it is not necessary to utilize one or more additional pistons, seals and other parts to move the hub for the turbine and/or the hub for the stator in the axial direction of the housing.

Figure 8:
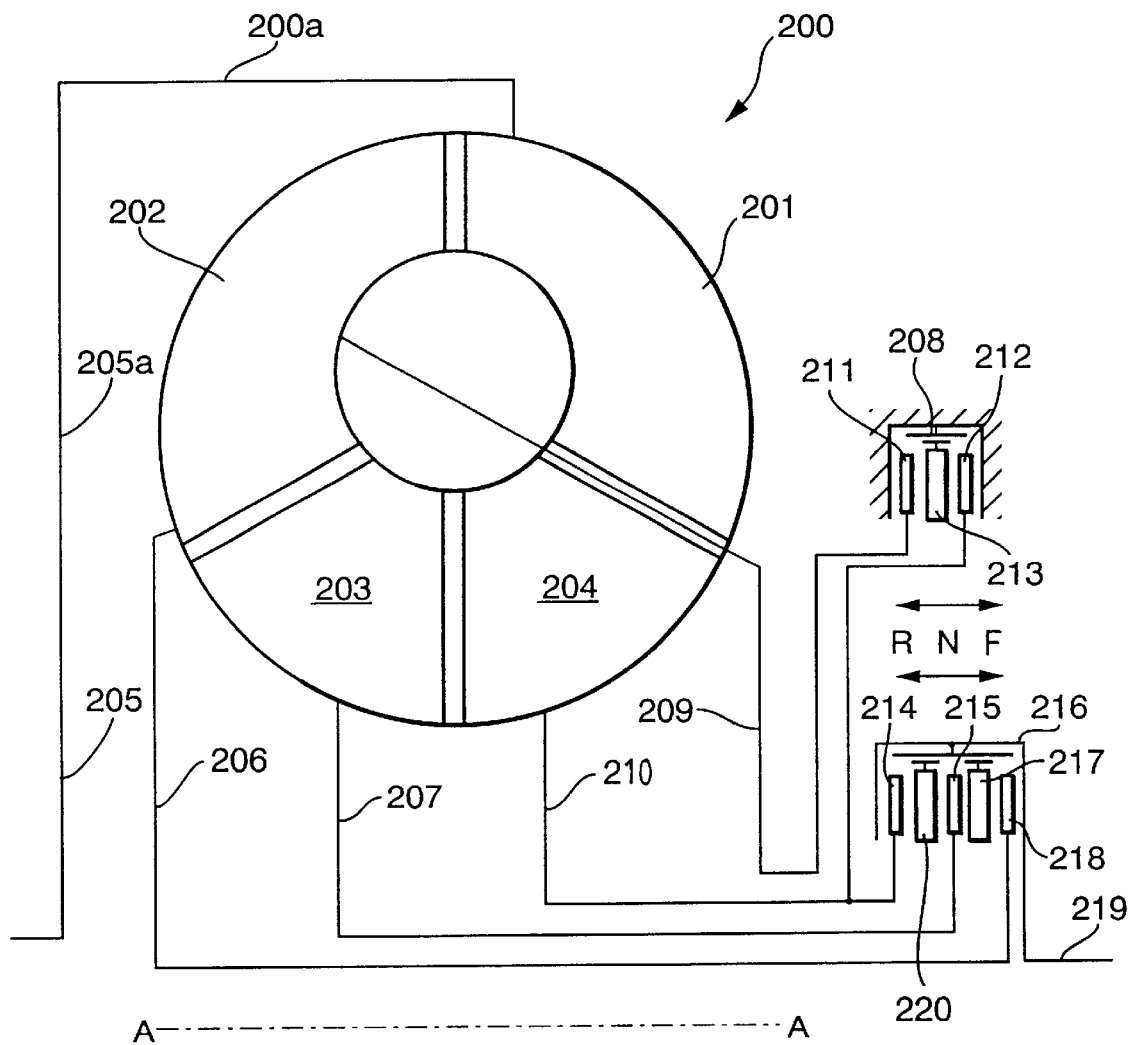
FIG. 8 is a schematic fragmentary axial sectional view of still another hydrokinetic torque converter and of a portion of a transmission which receives torque from the output device of the torque converter.

FIG. 8 shows one-half of a hydrokinetic torque converter 200 which is rotatable about an axis A—A. The rotary housing 200a of the torque converter 200 transmits torque to a pump 201 when the wall 205a of the housing in receives torque from the rotary output member 205 (e.g., a camshaft or a crankshaft) of a prime mover (such as an internal combustion engine in the power train of a motor vehicle). The housing 200a further contains a turbine 202 which can rotate with and relative to the pump 201, and two stators 203, 204.

The stator 204 is put to use when the transmission is to drive the motor vehicle in a forward direction. At such time, the pump 201 establishes a circulating flow of fluid in the housing 200a, and more specifically within the torus defined by the parts 201 to 204, and such fluid flow rotates the turbine 202. The stator 204 deflects the fluid flow in a tangential direction. The other stator 203 is put to use when the motor vehicle is to be driven in reverse; this stator constitutes a fourth element of the torus and is free to rotate with the fluid flow when the motor vehicle is to be driven in a forward direction; at such time, the stator 203 does not effect or cause any appreciable deflection of the fluid flow in a tangential direction. However, the stator 203 (i.e., an element of the torus) can cause a deflection of the fluid flow in the axial and radial direction of the housing 200a.

When the torque converter 200 operates in a forward mode, the turbine 202 is connected with the input shaft 219 of the transmission. A connector 206 transmits torque from the turbine 202 to the clutch disc 218 of a friction clutch 216 operating between the torque converter 200 and the rotary input shaft 219 of an automated transmission. This clutch further comprises an axially movable pressure plate 217 which urges the clutch disc 218 against a radially extending friction plate of the input shaft 219. The latter is installed in the stationary case 208 of the transmission, and this case 208 is connected with the stator 204. Tho this end, a connector 210 of the stator 204 is connected with a friction disc 212 which is urged against a friction surface of the case 208 by an axially movable pressure plate 213. At such time, the clutch discs 211 and 215 are free to rotate about the axis A-A.

When the transmission in the case 208 is to drive the motor vehicle in reverse, the pump 201 is connected with the output member 205 of the prime mover by way of the wall 205a of the housing 200a. Therefore, when the housing 200a is driven by the output member 205 of the prime mover, the pump 201 causes the establishment of a fluid flow in the torus. The turbine 202 is connected with the clutch disc 211 by way of a connector 209, and the pressure plate 213 urges the clutch disc 211 against the stationary case 208 of the transmission so that the turbine 202 cannot rotate about the axis A-A.

When the motor vehicle is to be driven in reverse, the two stators 203, 204 are connected with the input shaft 219 of the transmission in the case 208 by way of the connectors 207, 210 and clutch discs 214, 215 which are respectively acted upon by pressure plates 220 and 217. At such time, the clutch discs 212, 218 are free to rotate about the axis A-A.

Figure 9:
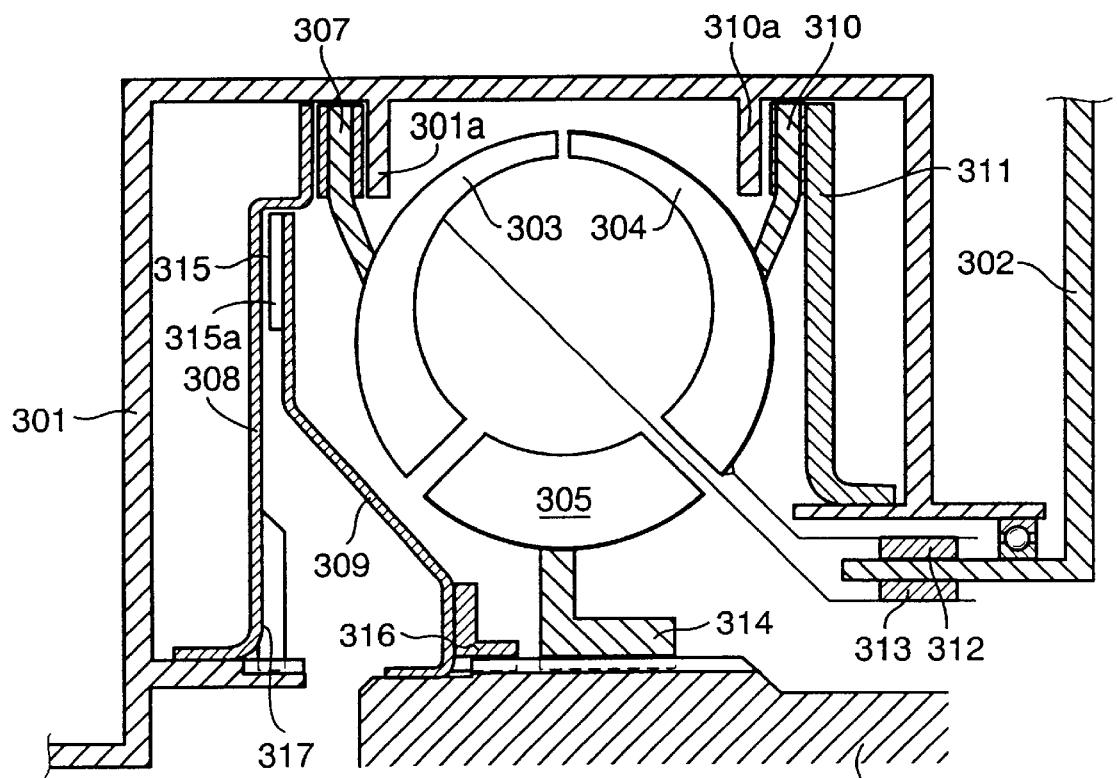
FIG. 9 is a fragmentary schematic axial sectional view of a further hydrokinetic torque converter.

FIG. 9 shows one-half of a further hydrokinetic torque converter which includes a rotary housing 301 connected to the output member of a prime mover (e.g., a camshaft or a crankshaft of an internal combustion engine). The turbine 303 in the housing 301 is connectable with such housing by way of a lockup clutch including an axially movable pressure plate 307. The lockup clutch further comprises a piston 308 which can move the pressure plate 307 against a counterpressure plate 301a affixed to or forming part of the housing 301. Thus, when the lockup clutch including the parts 307, 308, 301a is engaged, the turbine 303 is compelled to rotate with the housing 301 due to frictional engagement between the parts 301a, 307 and 308.

A second clutch including a clutch disc 310 affixed to the pump 304 of the torque converter of FIG. 9, an axially movable plate or piston 311, and a counterpressure plate 310a of the housing 301 serves to separably couple the pump 304 to the housing 301 in response to axial movement of the piston 311 in a direction to the left (as viewed in FIG. 9).

A third clutch 315 including the aforementioned piston 308, a clutch disc 315a and a piston 309 is provided to non-rotatably connect the stator 305 to the housing 301. To this end, a hub 306 is non-rotatably but axially movably mounted (by mating gears) on the output element 306 of the torque converter, and a radially inner part or hub 314 of the stator 305 is also connected with the output element 306 (i.e., with the input element of the transmission) by mating gears or the like.

The clutch including the members 307, 308 is disengaged when the torque converter operates in the forward mode.

The pump 304 is connected with the housing 301 by a freewheel 312 in such a manner that the freewheel 312 can turn in the direction of rotation of the output member of the prime mover which drives the housing 301 but the freewheel 312 prevents the pump 304 from rotating in the opposite direction. The fluid in the torus including the turbine 303, the pump 304 and the stator 305 circulates clockwise under the action of the turbine 303 to rotate the stator 305 in the direction of rotation of the housing 301, i.e., in the direction of rotation of the output member of the prime mover. The freewheel 312 holds the pump 304 against rotation in the opposite direction, i.e., counter to the direction of rotation of the housing 301.

The stator 305 and its radially inner part 314 are compelled to rotate with the output element 306. This takes place when the composite lockup clutch including the clutch 315 and the clutch composed on the parts 307, 301a, 308, 317 is disengaged.

As already mentioned above, the radially inner part 314 of the stator 305 can be connected for rotation with the output element 306, and the piston 308 can establish a torque transmitting connection between the housing 301 and the output element 306.

When the torque converter of FIG. 9 is set up to drive the motor vehicle in reverse, the clutch including the parts 310, 310a, 311 is engaged so that the pump 304 is compelled to rotate with the housing 301. The piston 311 then biases the clutch disc 310 against the counterpressure plate 310a of the housing 301. The clutches including the parts 307, 307a, 308 and 309, 315a (clutch 315) and 308, 315a, 309, 317 are disengaged and a freewheel 313 connects the turbine 303 for rotation with the housing 301. Thus, the turbine 303 can turn in one direction but is held against rotation relative to the housing 301 in the opposite direction. The fluid circulates in the torus under the action of the pump 303 and rotates the stator 305 which causes its radially inner part 314 to rotate the output element 306 in a counterclockwise direction.

The distribution of the parts 303, 304 and 305 is such that the pump 304 and the turbine 303 are mirror images of each other and the stator 305 is disposed in the clearance between the radially inner portions of the parts 303, 304.

The clutches 301a, 307, 308 and 310, 310a, 311a are installed in the radially outer portion of the housing 301. The parts 307, 310 of these clutches resemble discs (annuli) and are non-rotatably affixed to the turbine 303 and the pump 304, respectively.

The character 302 denotes the stationary case of the transmission which receives torque from the output element 306.

Figure 10:
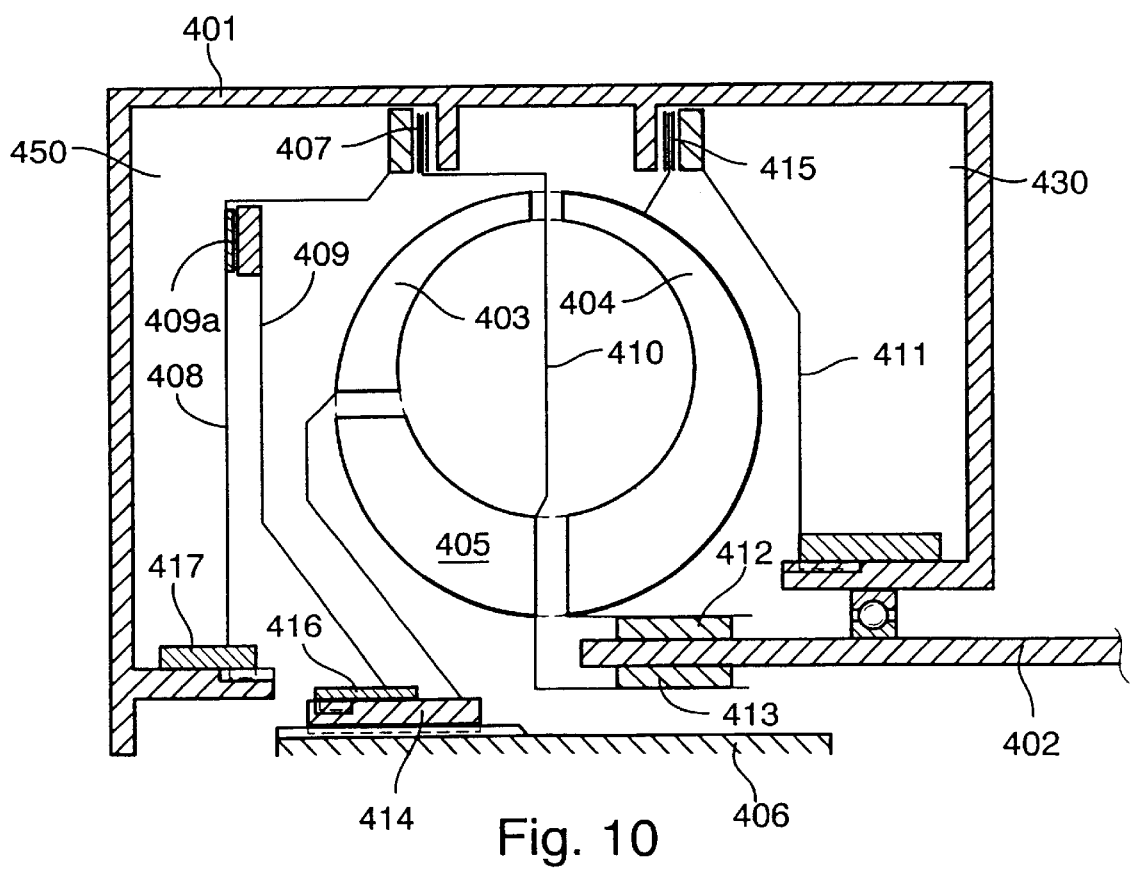
FIG. 10 is a similar fragmentary schematic axial sectional view of a torque converter constituting a modification of the torque converter which is shown in FIG. 9.

FIG. 10 shows a torque converter which differs from the torque converter of FIG. 9 in that the pump 404 extends along an arc of at least close to 180° opposite a turbine 403 and a stator 405. The turbine 403 extends along an arc of at least close to 90°, the same as the stator 405, and the turbine 403 is located radially outwardly of and surrounds the stator 405. The parts 403–405 are installed in the housing 401 of the torque converter, and such housing is assumed to be driven by the rotary output member (such as a crankshaft or a camshaft) of a prime mover (such as an internal combustion engine in the power train of a motor vehicle).

A first friction clutch 415 is provided to connect (when necessary) the pump 404 with the housing 401 when the motor vehicle is to be driven in a forward direction. At such time, a piston 411 of the clutch 415 urges an axially movable pressure plate of the pump 304 against a counterpressure plate which is affixed to the housing 401. The piston 411 is caused to engage the clutch 415 in response to a rise of fluid pressure in a plenum chamber 430 in the housing 401.

A second friction clutch 450 and a third friction clutch 407 are installed in the housing 401 radially outwardly of the stator 405 adjacent the turbine 403. The clutches 407, 450 (which respectively include axially movable pistons 409, 408) are disengaged when the clutch 415 is engaged. The clutch 407 further includes a clutch disc connected with the stator 405 by a connector 410, and a counterpressure plate affixed to or forming part of the housing 401. The clutch 450 comprises the aforementioned piston 408 which can bias a clutch disc 408a against a counterpressure plate (piston 409 non-rotatably but axially movably mounted on the output element 406). A freewheel 413 connects the stator 405 with the stationary case 402 of the transmission. The turbine 403 drives the output element 406 by way of a hub 414 which can move axially of but cannot rotate relative to the output element 406. The stator 405 can rotate (in one direction) relative to the transmission case 402 by way of a freewheel 412.

The clutch 450 can be engaged when the RPM of the turbine 403 and/or housing 401 rises to a predetermined value; this causes the output element 406 to rotate with the housing 401 with or without slip. The piston 409 of the clutches 407, 450 is axially movably but non-rotatably connected with the hub 414 against rotation with the output element 406, but the piston 409 can move axially of the output element 406.

In the reverse mode, the stator 405 is connected with the housing 401 by the flange-like connector 410 and the clutch 407. Such condition can be arrived at by raising the fluid pressure in a plenum chamber between the housing 401 and the piston 408; this causes the piston 408 to bear upon the clutch disc of the clutch 407 and to thus engage the clutch 407. The clutches 450 and 415 are disengaged and the piston 411 is connected with the transmission case 402 by way of a freewheel. The part 404 is connected with the transmission case 402 by the freewheel 412 so that it can rotate relative to the case 402 in one direction but is held against rotation in the opposite direction. The part 405 acts as a pump and is compelled to rotate with the housing 401. The part 403 performs the function of a turbine and transmits torque to the output element 406 of the torque converter. The part 404 performs the function of a stator.

The torque converters of FIGS. 9 and 10 can employ claw clutches and synchronizing units between the radially inner part 314 of the part 305 and the output element 306 of FIG. 9, as well as between the hub 414 and the output element 406 of FIG. 10. An advantage of such designs is that no superfluous drag torque need be transmitted when the transmission in the case 302 or 402 is in neutral gear.

Referring again to FIG. 10, the part 417 serves to non-rotatably but axially movably connect the piston 408 to the housing 401, and the part 416 serves to non-rotatably but axially movably connect the piston 409 to the hub 414.

Figure 11A:
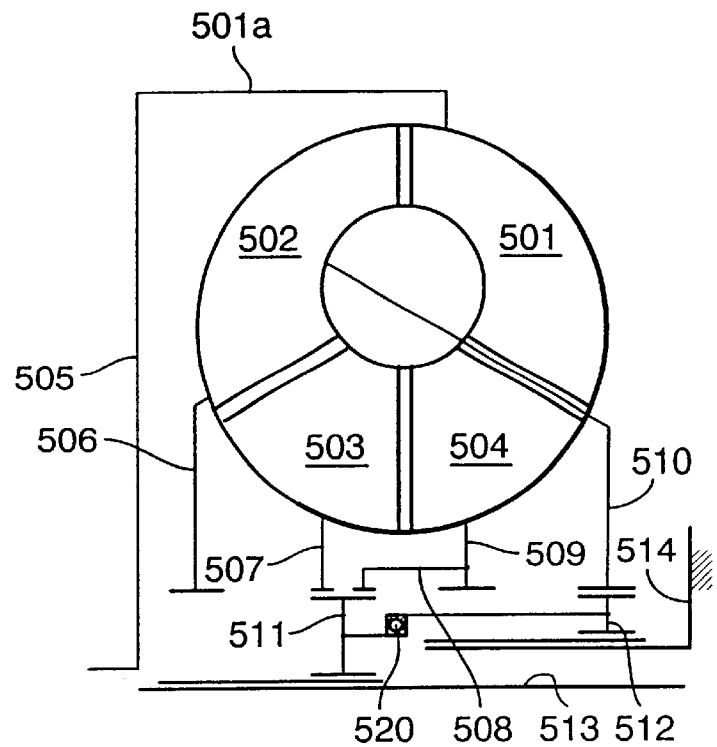
FIG. 11a is a fragmentary schematic axial sectional view of a further torque converter with the hubs for the turbine and the stators illustrated in first axial positions in which the output device of the torque converter set to to transmit torque in a direction to cause the transmission to drive the motor vehicle in reverse.
Figure 11B:
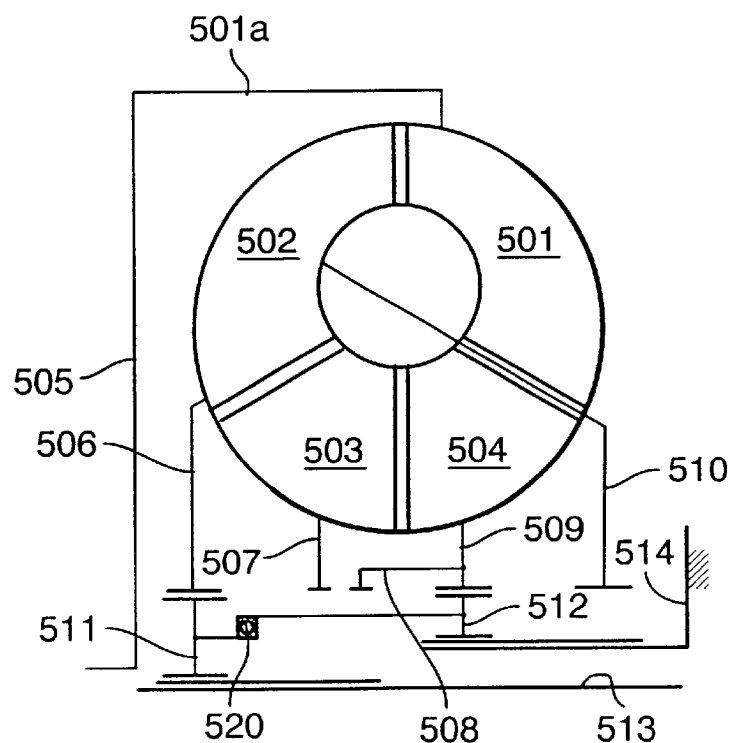
FIG. 11b illustrates the structure of FIG. 11a but with the hubs in axial positions in which the transmission is ready to drive the motor vehicle in a forward direction.
Figure 11C:
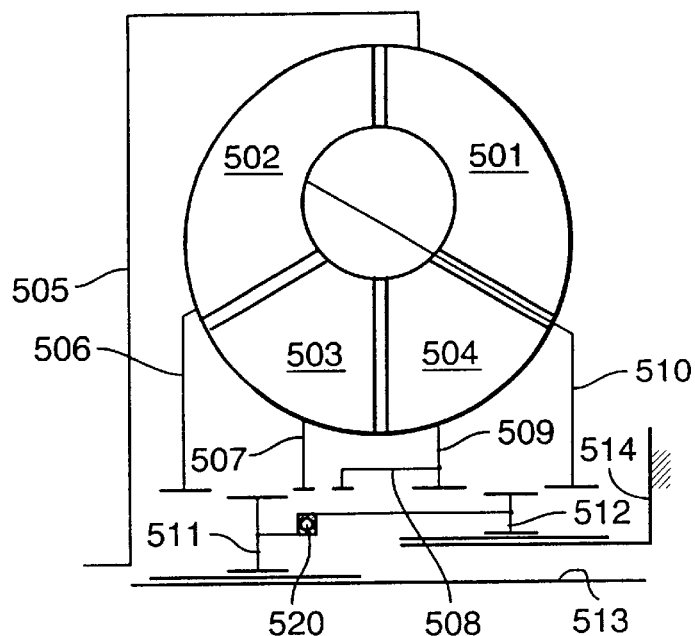
FIG. 11c illustrates the structure of FIGS. 11a and 11b but with the hubs in axial positions in which the transmission is in neutral gear.

FIGS. 11a, 11b and 11c show three different conditions of a further hydrokinetic torque converter. This torque converter comprises a housing 501a for four rotary components 501, 502, 503 and 504. At least one of these components can act as a pump, at least one other component can act as a turbine, and at least one further component can act as a stator. Three of these four components can be active when the torque converter is utilized to drive the wheels of a motor vehicle in a forward direction. One of the four components is then free to rotate. Three of the four components, but in a different combination, can be put to use when the torque converter is called upon to drive the motor vehicle in reverse; however, the geometry and the conversion characteristics are different when the motor vehicle is driven while the associated transmission is shifted into reverse gear. Two stators can be rigidly connected to each other when the transmission is shifted into reverse gear.

FIG. 11a shows the torque converter in a condition in which its output element 513 (this output element can constitute or it can be connected with the input shaft of a transmission in the case 514) is capable of rotating in a direction to move the motor vehicle rearwardly. The component 501 acts as a pump and is driven by the housing 501a which, in turn, is driven by the rotary output member 505 of the prime mover (e.g., the crankshaft or camshaft of an internal combustion engine). When the component (pump) 501 rotates, it effects a rotation of the component (turbine) 502 and of one (504) of the components (stators) 503, 504 whereby the component 504 effects a change of the direction of fluid flow. within the torus. The part 503 (second stator) is effective when the motor vehicle is driven in reverse; this component 503 constitutes the fourth component of the torus and is free to rotate when the torque converter is caused to assume the condition or mode which is shown in FIG. 11a. At such time, the component 503 permits a change in the direction of fluid flow as seen radially and axially of the housing 501a but does not permit a deflection in a tangential direction.

The component (turbine) 502 of the torque converter is non-rotatably connected with the output element 513 which latter comprises an external gear mating with the internal gear of a hub 511 for the component (turbine) 502. The hub 511 and the connector 506 between the component 502 and the hub 511 are provided with a synchronizing unit, e.g., a multiple-cone synchronizer, which serves to conform the RPM of the hub 511 to that of the component 502, i.e., which at least reduces the difference between the RPM of the component 502 and the RPM of the hub 511 before the parts 502, 511 are form-lockingly connected to each other.

The part (stator) 504 is mounted on its shaft by a freewheel 509 having an internal gear adapted to mesh with an external gear on the hub 512 for the component 504 upon appropriate synchronization of rotational speeds of the part 504 and the hub 512. The hub 512 is further provided with an internal gear mating with an external gear on a coaxial shaft affixed to or forming part of the transmission case 514. An antifriction thrust bearing 520 is provided between the hubs 511 and 512.

The hubs 511 and 512 are movable axially of the torque converter by an actuator (e.g., a fluid-operated motor, an electric motor or the like). The torque converter is set for operation in a forward mode in response to a leftward movement of the hubs 511, 512, namely toward the output member 505 of the prime mover.

In FIG. 11a, the hubs 511, 512 are located adjacent the transmission case 514. At such time, the transmission is ready to drive the motor vehicle in reverse. The component (pump) 501 is non-rotatably connected with the output member 505. If the prime mover is on, the rotating component (pump) 501 injects fluid into the component (turbine) 502 which, in turn, deflects the fluid toward the component (stator) 503 (this component is operative to effect a reverse movement of the motor vehicle) as well as toward the component (stator) 504. The connector 510 for the component (turbine) 502 is non-rotatably coupled to the transmission case 514. The components (stators) 503, 504 are non-rotatably coupled to each other and operate to direct the fluid back into the range of the component (pump) 501. Thus, in accordance with the just outlined feature of the invention, the composite stator including the components 503, 504 turns in a direction counter to that of the output member 505 of the prime mover; therefore, the motor vehicle can be driven in reverse.

At such time, the component (turbine) 502 is non-rotatably connected with the transmission case 514 (i.e., with the aforementioned shaft which is rigid with the transmission case and is caxial with the torque converter). The connector 510 has an internal gear meshing with an external gear on the hub 512, and an internal gear of the hub 512 is in mesh with an external gear of the output member 513. The engagement between the internal gear of the connector 510 and the external gear of the hub 512 takes place by way of a suitable synchronizing unit (not specifically shown) which conforms the RPM of the component (turbine) 502 to that of the hub 512 before the parts 510, 512 are non-rotatably coupled to each other.

The components (stators) 503, 504 have internal gears which mate or are adapted to mate with external gears on the member 513. The internal gear of the radially inner part 507 of the component (stator) 503 and the internal gear of the radially inner part 508 of the component (stator) 504 are in mesh with one or more external gears of the hub 511. The latter has an internal gear which meshes with an external gear of the output element 513 (i.e., of the input element of the transmission in the case 514). The hubs 511, 512 can move as a unit in the axial direction of the torque converter between one end position (forward mode, see FIG. 11b), another end position (reverse mode, see FIG. 11a), and an intermediate position (neutral mode, see FIG. 11c).

Referring to FIG. 11c, the hubs 511, 512 are not connected with the components (composite stator means) 503, 504 and the component (turbine) 502, respectively. The component (turbine) 502 and the components (stators) 503, 504 are free to rotate in the circulating fluid flow because they are not connected with the housing 501a and/or with the output element 513 of the torque converter.

Figure 12:
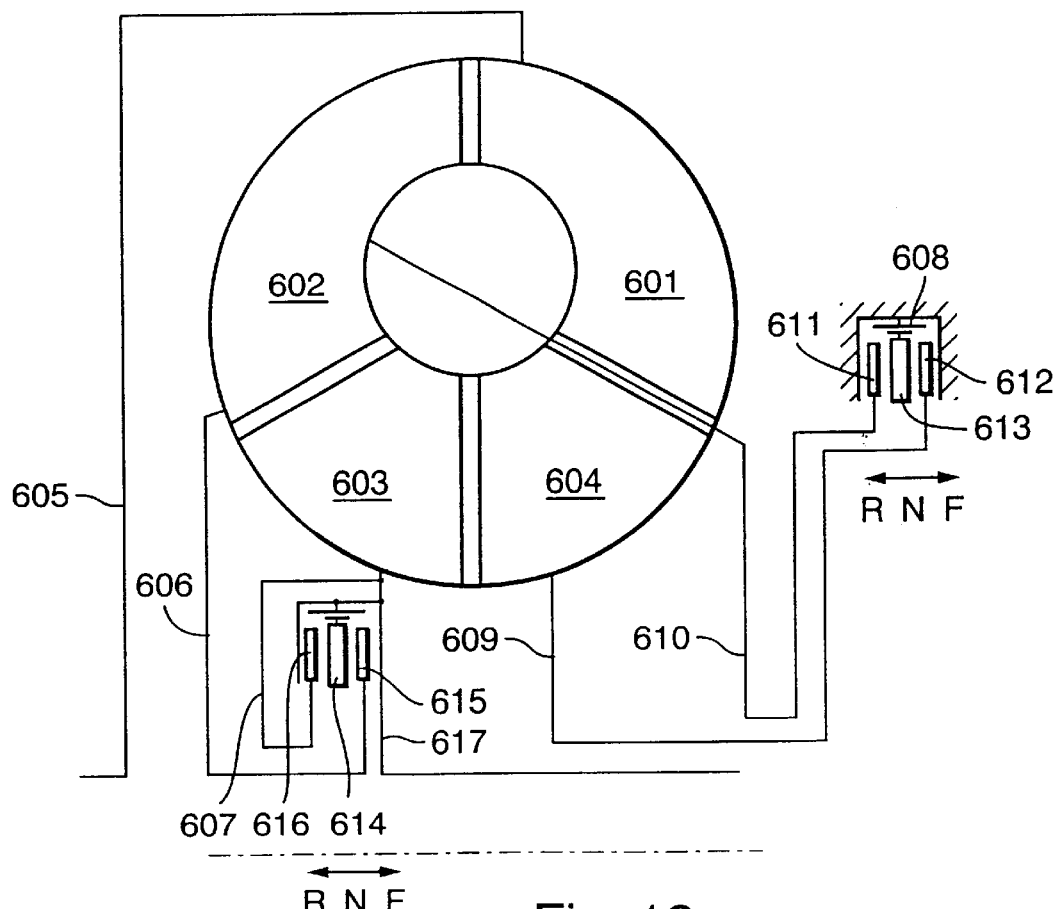
FIG. 12 is a fragmentary schematic axial sectional view of a hydrokinetic torque converter constituting a modification of the torque converter which is illustrated in FIGS. 11a to 11c.

FIG. 12 shows one-half of a hydrokinetic torque converter including a housing 605 containing a pump 601, a turbine 602, and stators 603, 604. The pump 601 is connected to and rotates with the housing 605 which latter can be driven by the rotary output member of a prime mover, not shown, e.g., by the camshaft or crankshaft of an internal combustion engine. The pump 601 can establish a fluid flow within the torus, and such fluid flow rotates the turbine 602. The stator 604 effects a change in the direction of the fluid flow. When the torque converter of FIG. 12 operates in the forward mode, the stator 603 is free to rotate about the common axis of the parts 601, 602, 604.

In the forward mode, the turbine 602 is connected (by a connector 606) with the clutch disc 615 of a first friction clutch which further comprises an axially movable pressure plate 614 arranged to establish a frictional engagement between the clutch disc 615 and the output shaft 617 of the torque converter when the clutch including the parts 614, 615 is engaged. At such time, a second friction clutch including the parts 612, 613 is disengaged. The stator 604 is connected with the case 608 of the transmission in that the pressure plate 613 of the second clutch maintains the clutch disc 612 (which is connected with the radially inner part 609 of the stator 604) in frictional engagement with the transmission case 608. Two additional friction clutches 611, 616 are disengaged so that the stator 603 is free to turn about the axis of the torque converter.

When the torque converter of FIG. 12 is set to operate in the reverse mode, the turbine 602 acts as a stator and the stator 603 drives the input shaft 617 of the transmission. At such time, the connector 610 of the turbine 602 is non-rotatably secured to the transmission case 608 by the pressure plate 613 and a clutch disc of the friction clutch 611. At the same time, the stator 603 is non-rotatably connected with the input shaft 617 of the transmission by way of the hub 607 and the clutch 616 including the pressure plate 614 and a clutch disc which bears against the hub 607. The clutches including the parts 614, 615 and 612, 613 are disengaged. FIG. 12 shows that each of the two axially movable pressure plates 613 and 614 is common to two neighboring friction clutches.

When the torque converter of FIG. 12 is set to operate in the neutral mode, all four clutches are disengaged, i.e., the torque which can be transmitted between the pump 601 and the input element 617 of the transmission is zero or close to zero.

Figure 13:
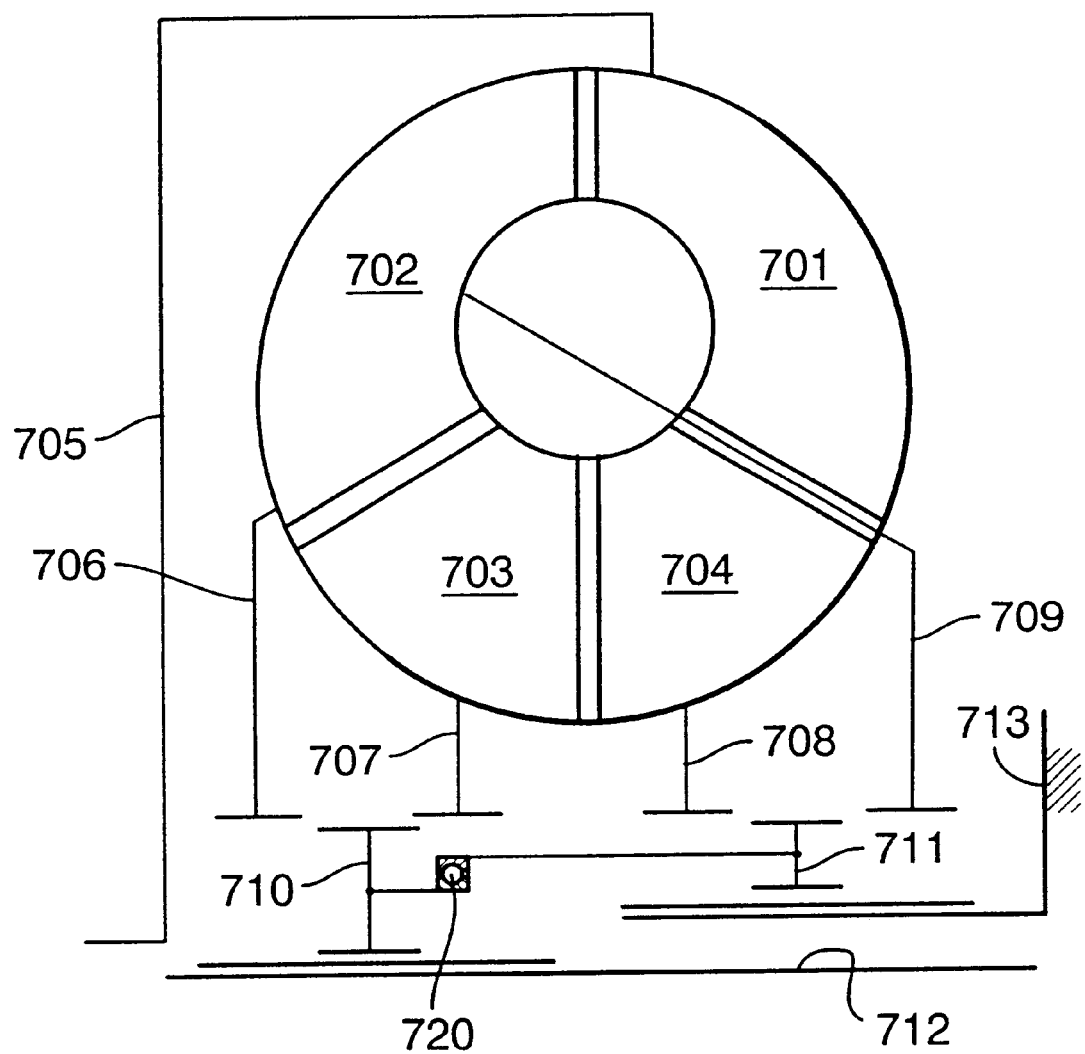
FIG. 13 is a fragmentary schematic axial sectional view of still another hydrokinetic torque converter constituting a modification of the torque converters shown in FIGS. 11a–11c and FIG. 12.

FIG. 13 shows a further embodiment of a hydrokinetic torque converter which comprises a pump 701 connected to a rotary housing 705 adapted to be driven by the output member of a prime mover. When the prime mover rotates the housing 705, the pump 701 establishes a flow of circulating fluid within the torus in the interior of the housing 705. The circulating fluid rotates the turbine 702 so that an internal gear of a connector 706 for the turbine can rotate the input element 712 of the transmission by way of an axially shiftable hub 710 having an external gear movable into and out of mesh with the internal gear of the connector 706. The hub 710 further comprises an internal gear which mates with an external gear of the input element 712.

When the torque converter of FIG. 13 is set to operate in the forward mode, a stator 704 in the housing 705 is form-lockingly connected with a hub 711 which has an external gear then mating with an internal gear of a radially inner part 708 of the stator 704. At such time, an internal gear of the hub 711 mates with an external gear of a shaft 713. A freewheel then connects the stator 704 with the transmission case.

When the torque converter of FIG. 13 is set to operate in a reverse mode, the hubs 710, 711 (which are rotatably coupled to each other by an antifriction thrust bearing 720) are held in such axial positions that the radially inner part 707 of the stator 703 is connected for rotation with the hub 710 (by way of mating internal and external teth), i.e., with the input element of the transmission. At the same time, the turbine 702 is connected with the shaft 713 for the stator 704 by way of a connector 709 having an internal gear then meshing with an external gear of the hub 711. The stator 704 is then free to rotate, the turbine 702 acts as a stator, and the stator 703 drives the input element 712 of the transmission by way of the radially inner part 707.

An important advantage of the improved torque converter is that it comprises a relatively small number of relatively simple parts; this contributes to compactness, simplicity and lower cost of the torque converter. Furthermore, and particularly if the torque converter is constructed in a manner as shown, for example, in FIGS. 11a to 11c, it can operate with considerable savings in fuel when the parts of the torque converter assume the position and conditions shown in FIG. 11c, i.e., when the input shaft of the transmission is disconnected from the turbine as well as from the stator(s) of the torque converter. Savings in fuel entail a reduction of the quantity of emitted combustion products which, too, is an important feature of a motor vehicle having a power train which embodies the improved torque converter.

The aforedescribed pairs of mating gears can include spur gears or splined shafts in combination with complementary internal gers, bevel gears and/or other types of gears.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art of hydrokinetic torque converters and, therefore, such adaptations should and are intended to be comprehended within the meaning and range of equvalence of the appended claims.

What is claimed is:

1. A hydrokinetic torque converter comprising a rotary housing; a pump confined in and rotatable by said housing; a rotary turbine component and at least one rotary stator component in said housing; a drive for said housing; an output device rotatable in clockwise and counterclockwise directions; means for connecting said output device with one of said components to rotate the output device in one of said directions; and means for connecting said output device with the other of said components to rotate said output device in the other of said directions, wherein at least one of said connecting means comprises at least one friction clutch.

2. The torque converter of claim 1, wherein at least one other of said connecting means comprises at least one engageable and disengageable clutch which permits the respective component to rotate said output device in the disengaged condition of the clutch.

3. The torque converter of claim 1, wherein at least one other of said connecting means comprises at least one form-locking clutch.

4. The torque converter of claim 1, having a first operating mode in which said output device is connected with said turbine to rotate in said one direction, and a second operating mode in which said output device is connected with at least one stator to rotate in said other direction.

5. The torque converter of claim 4, wherein the torque converter has a third operating mode in which said output device is disconnected from said turbine and from said at least one stator.

6. The torque converter of claim 4, further comprising at least one engageable and disengageable clutch arranged to transmit torque between said turbine and said output device in said first operating mode of the torque converter.

7. The torque converter of claim 6, further comprising a rotary hub arranged to receive torque from said at least one clutch and form-locking connection arranged to transmit torque between said hub and said output device.

8. The torque converter of claim 4, further comprising at least one engageable and disengageable clutch arranged to transmit torque between said at least one stator and said output device in said second operating mode of said torque converter.

9. The torque converter of claim 8, further comprising a rotary hub arranged to receive torque from said at least one clutch and form-locking connection arranged to transmit torque between said hub and said output device.

10. The torque converter of claim 4, wherein at least one other of said connecting means comprises gears movable into and out of mesh with each other.

* * * * *